United States Patent
Yano et al.

(10) Patent No.: US 9,365,755 B2
(45) Date of Patent: Jun. 14, 2016

(54) REACTIVE PLASTICIZER AND CURABLE COMPOSITION CONTAINING SAME

(75) Inventors: Ayako Yano, Takasago (JP); Takahiro Saito, Takasago (JP); Masaomi Sakabe, Takasago (JP)

(73) Assignee: KANEKA CORPORATION, Osaka (JP)

( * ) Notice: Subject to any disclaimer, the term of this patent is extended or adjusted under 35 U.S.C. 154(b) by 258 days.

(21) Appl. No.: 13/993,927

(22) PCT Filed: Dec. 8, 2011

(86) PCT No.: PCT/JP2011/078375
§ 371 (c)(1),
(2), (4) Date: Jun. 13, 2013

(87) PCT Pub. No.: WO2012/081483
PCT Pub. Date: Jun. 21, 2012

(65) Prior Publication Data
US 2013/0281591 A1 Oct. 24, 2013

(30) Foreign Application Priority Data
Dec. 13, 2010 (JP) ................. 2010-277162

(51) Int. Cl.
C09J 171/02 (2006.01)
C08F 8/42 (2006.01)
C08G 65/336 (2006.01)
C09K 3/10 (2006.01)
C08L 71/02 (2006.01)
C08G 65/26 (2006.01)

(52) U.S. Cl.
CPC ............... C09J 171/02 (2013.01); C08F 8/42 (2013.01); C08G 65/2609 (2013.01); C08G 65/336 (2013.01); C08L 71/02 (2013.01); C09K 3/10 (2013.01); C08G 2650/24 (2013.01)

(58) Field of Classification Search
CPC ....................................................... C09J 171/02
See application file for complete search history.

(56) References Cited

U.S. PATENT DOCUMENTS

| | | | |
|---|---|---|---|
| 4,904,732 | A | 2/1990 | Iwahara et al. |
| 4,906,707 | A | 3/1990 | Yukimoto et al. |
| 6,248,915 | B1 | 6/2001 | Ito et al. |
| 6,437,071 | B1 | 8/2002 | Odaka et al. |
| 7,144,953 | B2 | 12/2006 | Ueda et al. |
| 2005/0004327 | A1 | 1/2005 | Ueda et al. |
| 2006/0270819 | A1 | 11/2006 | Fujimoto |
| 2007/0173620 | A1* | 7/2007 | Kono ............ 525/477 |
| 2008/0188624 | A1 | 8/2008 | Yano et al. |
| 2011/0213058 | A1 | 9/2011 | Yano et al. |
| 2013/0281591 | A1 | 10/2013 | Yano et al. |

FOREIGN PATENT DOCUMENTS

| | | |
|---|---|---|
| JP | 52-073998 A | 6/1977 |
| JP | 63-006041 A | 1/1988 |
| JP | 4-57850 A | 2/1992 |
| JP | 5-039428 A | 2/1993 |
| JP | 5-59267 A | 3/1993 |
| JP | 5-117519 A | 5/1993 |
| JP | 09-012860 A | 1/1997 |
| JP | 9-095609 A | 4/1997 |
| JP | 9-95609 A | 4/1997 |
| JP | 9-95619 A | 4/1997 |
| JP | 9-095619 A | 4/1997 |
| JP | 9-118818 A | 5/1997 |
| JP | 2687038 B2 | 12/1997 |
| JP | 2708833 B2 | 2/1998 |
| JP | 10-251616 A | 9/1998 |
| JP | 2000-234064 A | 8/2000 |
| JP | 2000-256458 A | 9/2000 |
| JP | 2000-313814 A | 11/2000 |
| JP | 2000-319399 A | 11/2000 |
| JP | 2000-327771 A | 11/2000 |
| JP | 2000-327902 A | 11/2000 |
| JP | 2000-345054 A | 12/2000 |
| JP | 3155035 B2 | 4/2001 |
| JP | 2003-147167 A | 5/2003 |
| JP | 2003-206410 A | 7/2003 |
| JP | 2004-224985 A | 8/2004 |
| JP | 2004-244528 A | 9/2004 |
| JP | 3575132 B2 | 10/2004 |
| JP | 2005-213446 A | 8/2005 |
| JP | 2005-213446 A1 | 8/2005 |
| JP | 2005-240049 A | 9/2005 |
| JP | 2007-204634 A | 8/2007 |
| JP | 2008-050448 A | 3/2008 |
| JP | 2005-240049 A | 9/2008 |
| JP | 2009-013430 A | 1/2009 |
| JP | 2009-108246 A | 5/2009 |

(Continued)

OTHER PUBLICATIONS

English machine translation of Otaka et al. (JP 2000-327902).*
Notice of Allowance and Fee(s) Due dated Jul. 23, 2014, issued in U.S. Appl. No. 13/881,290 (12 pages).
Japanese Office Action dated Mar. 31, 2015, issued in corresponding JP Patent Application No. 2012-548759 (2 pages).
International Search Report for PCT/JP2011/074459, mailing date of Dec. 27, 2011.
Translation of the International Preliminary Report on Patentability (PCT/IB/373) (1 page), (PCT/ISA/237) (3 pages) of International Application No. PCT/JP2011/074459 mailed Dec. 27, 2011.

(Continued)

*Primary Examiner* — Michael Pepitone
(74) *Attorney, Agent, or Firm* — Westerman, Hattori, Daniels & Adrian, LLP

(57) ABSTRACT

An organic polymer, having a number-average molecular weight of 800 to 15,000, and comprising 0.5 or more but less than 1.2 reactive silicon groups in each molecule of the polymer on average, in which the reactive silicon groups are introduced into one-side out of terminals thereof, and heightening, in particular, the proportion of molecules (of the polymer) into each of which the silicon group is introduced.

8 Claims, No Drawings

(56) References Cited

FOREIGN PATENT DOCUMENTS

| | | | |
|---|---|---|---|
| JP | 2009-249494 A | 10/2009 | |
| JP | 2010-100862 A | 5/2010 | |
| JP | 2010-150380 A | 7/2010 | |
| JP | 2010-150381 A | 7/2010 | |
| JP | 2011-111525 A | 6/2011 | |
| WO | 2004/060953 A1 | 7/2004 | |
| WO | 2004/092270 A1 | 10/2004 | |
| WO | 2005/042607 A1 | 5/2005 | |
| WO | 2005/073322 A1 | 8/2005 | |
| WO | 2006/070637 A1 | 7/2006 | |

OTHER PUBLICATIONS

Akisada Endo et al., Plastics haigozai-Kiso to Oyo—(Plastics Additives—Fundamentals and Applications -), Taiseisha Ltd., Nov. 30, 1996. pages 90-91, with Partial English Translation thereof.

International Search Report of PCT/JP2009/066734, mailing date Dec. 22, 2009.

International Preliminary Report on Patentability (Form PCT/IB/373) of International Application No. PCT/JP2009/066734, dated May 10, 2011 with Forms PCT/ISA/237.

Office Action dated May 30, 2013, issued in U.S. Appl. No. 13/121,493 (11 pages).

Office Action dated Apr. 9, 2014, issued in U.S. Appl. No. 13/881,290 (17 pages).

Notice of Allowance Dated Nov. 8, 2013, issued in U.S. Appl. No. 13/121,493 (11pages).

International Search Report of PCT/JP2011/078375, Mailing Date of Feb. 21, 2012.

Translation of the International Preliminary Report on Patentability (PCT/IB/338) (1 page), (PCT/IB/373) (1 page) of International Application No. PCT/JP2011/078375 mailed Jun. 27, 2013 (Form PCT/ISA/237) (1 page).

* cited by examiner

REACTIVE PLASTICIZER AND CURABLE COMPOSITION CONTAINING SAME

CROSS-REFERENCE TO RELATED APPLICATIONS

This application is a national stage application filed under 35 U.S.C. §371 of International Application No. PCT/JP2011/078375, filed Dec. 8, 2011, which claims priority to Japanese Patent Application No. 2010-277162 filed on Dec. 13, 2010, the entire contents of which are incorporated herein by reference.

TECHNICAL FIELD

The present invention relates to a reactive plasticizer containing a reactive silicon group. The present invention relates further to a curable composition in which an organic polymer containing a reactive silicon group is combined with the reactive plasticizer.

BACKGROUND ART

It is known that organic polymers each containing, in the molecule thereof, at least one reactive silicon group have a property of being each crosslinked even at room temperature by siloxane-bond-formation which follows, for example, a hydrolysis reaction of the reactive silicon group by effect of moisture or some other, so as to give a rubbery cured product.

"Patent Document 1" and others disclose, among these reactive-silicon-group-containing organic polymers, polymers wherein their main chain skeletons are a polyoxyalkylene polymer, a saturated hydrocarbon polymer, and a poly(meth)acrylate copolymer, respectively. These polymers have been already industrially produced, and used widely for sealing materials, adhesives, coating materials, paints and other articles.

The polymers have been increasing in share in the market over 30 years, particularly, for use as sealing materials for architecture. In recent years, detached houses in which siding boards are used have been become a main current; and a sealing material has been used also as a joining material between the siding boards. However, the siding boards are porous boards; thus, it has come to be understood that while the boards are exposed to the outdoors over a long term, the plasticizer is being absorbed little by little into the boards so that the cured product tends to be being lowered in elongation. The plasticizer used in the sealing material for the siding boards is a phthalic acid ester, which has a low molecular weight. It is known that the tendency can be improved by using a high molecular weight plasticizer instead of the low molecular weight plasticizer. However, the advantageous effect thereof is insufficient. The so-called reactive plasticizer, which is a high molecular weight plasticizer having reactive silicon groups at its terminals or main chain, reacts with an organic polymer having a reactive silicon group. Thus, after the sealing material precursor is cured, bleeding-out is not easily caused. This technique has already been known. However, according to conventional methods for introducing the silicon groups, the proportion of molecules having terminals into which the silicon groups are introduced is at most 80 percent, so that a component into which no silicon group is introduced remains. As a result, a limitation is imposed on the bleeding-out-improving effect.

When a sealing material for architecture or an external wall is deteriorated with time, a paint may be applied onto the sealing material or wall. However, there is frequently caused a problem that a coat of the paint applied onto the sealing material comes to be stained. This is because its low molecular weight plasticizer, such as a phthalic acid ester, shifts into the paint coat and then the paint coat softens, whereby dirt adheres thereto. In this case also, the actual situation can be made better by use of a high molecular weight plasticizer or a reactive-silicon-group-introduced reactive plasticizer. However, the advantageous effect of the use is insufficient.

Even when a wall material is stretched or shrunken by effect of, for example, temperature, a sealing material thereon for architecture needs to follow the wall material. The sealing material is therefore desired to be low in modulus and high in elongation, and further high in elastic restorability. In order that a cured product of a curable composition containing a reactive-silicon-group-having organic polymer can exhibit the properties of low modulus and high elongation, several methods are known. One of the methods is a method of increasing the quantity of a plasticizer therein. However, the method causes problems that the elastic restorability is declined and further the cured product is deteriorated in weather resistance. Alternatively, there is a method of decreasing, in the reactive-silicon-group-having organic polymer, the number of its silicon groups contained in each molecule of the polymer. However, tackiness of the surface of the cured product (hereinafter referred to as remaining tackiness) is unfavorably generated. There is also a method of increasing the molecular weight of the organic polymer while the number of the silicon groups contained in each molecule of the polymer is made constant. However, the viscosity of the organic polymer rises, and with the rise, the viscosity of the curable composition also rises to cause problems that the curable composition is deteriorated in workability and further lowered in elastic restorability.

PRIOR ART DOCUMENTS

Patent Documents

Patent Document 1: JP 2708833 B1
Patent Document 2: JP-A-2004-224985
Patent Document 3: JP-A-2004-244528
Patent Document 4: JP-A-2005-213446
PATENT DOCUMENT 5: JP-A-5-59267
PATENT DOCUMENT 6: JP-A-9-95609
PATENT DOCUMENT 7: JP-A-9-95619
PATENT DOCUMENT 8: JP-A-2005-240049
PATENT DOCUMENT 9: JP-A-4-57850
PATENT DOCUMENT 10: WO 2004/060953 A
PATENT DOCUMENT 11: WO 2005/042607 A
PATENT DOCUMENT 12: JP-A-2009-013430
PATENT DOCUMENT 13: JP-A-2000-319399

SUMMARY OF THE INVENTION

Problems to be Solved by the Invention

An object of the present invention is to provide a curable composition usable mainly as a sealing material for architecture, and improved in resistance against staining a surrounding base material such as stone material, or a paint. Another object thereof is to provide a curable composition having a high elastic restorability that can follow a joining material that may largely move.

Means for Solving the Problems

In order to solve the above-mentioned problems, the inventors have made eager investigations to find out that the problem of staining a surrounding base material such as stone material, or a paint can be solved by using an organic polymer in which a reactive silicon group is introduced into one-side out of terminals thereof, and heightening, in particular, the proportion of molecules (of the polymer) into each of which the silicon group is introduced. Furthermore, the inventors have found out that the use of the organic polymer having the specific functional group improves the organic polymer in elastic restorability. Thus, the present invention has been accomplished.

That is, the present invention relates to:

(I). an organic polymer (A), having a number-average molecular weight of 800 to 15,000, and comprising 0.5 or more but less than 1.2 reactive silicon groups in each molecule of the polymer on average, the silicon group(s) being (each) represented by the following general formula (1):

$$—Y—R^1—CH(CH_3)—CH_2—Si(R^2{}_{3-a})X_a \quad (1)$$

wherein $R^1$ represents a bivalent organic group having 1 to 20 carbon atoms and containing, as one or more constituent atoms, one or more selected from the group consisting of hydrogen, carbon and nitrogen atoms; $R^2$(s) (each) represent(s) an alkyl group having 1 to 20 carbon atoms, an aryl group having 6 to 20 carbon atoms, an aralkyl group having 7 to 20 carbon atoms, or a triorganosiloxy group represented by —OSi(R')$_3$ wherein the three R's, which may be the same or different, are each a monovalent hydrocarbon group having 1 to 20 carbon atoms; X(s) (each) represent(s) a hydroxyl group or a hydrolysable group provided that when Xs, the number of which is two or more, are present, Xs may be the same or different; Y is a heteroatom, and is selected from an oxygen atom or a nitrogen atom; and a is an integer of 1 to 3;
(II). the organic polymer according to (I), which has a linear main chain;
(III). the organic polymer according to (I) or (II), wherein the reactive silicon group(s) of the organic polymer (A) is/are present substantially only at one out of terminals of the organic polymer (A);
(IV). the organic polymer according to any one of (I) to (III), wherein $R^1$(s) in the general formula (1) is/are (each) $CH_2$;
(V). the organic polymer according to any one of (I) to (IV), wherein Y in the general formula (1) is an oxygen atom;
(VI). the organic polymer according to any one of (I) to (V), wherein a in the general formula (1) is 2;
(VII). the organic polymer according to any one of (I) to (VI), wherein the main chain of the organic polymer (A) is one or more selected from polyoxyalkylene polymers, polyacrylic polymers, and hydrocarbon polymers;
(VIII). the organic polymer according to any one of (I) to (VII), wherein the main chain of the organic polymer (A) is polyoxypropylene polymer;
(IX). the organic polymer according to any one of (I) to (VIII), which is obtained by introducing the reactive silicon group (s) (each) represented by the general formula (1) into a polyoxypropylene polymer yielded by causing propylene oxide to react in the presence of a composite metal cyanide complex catalyst, and yielded by using an initiator having, in a single molecule thereof, only one hydroxyl group;
(X). the organic polymer (A) according to any one of (I) to (IX), which is obtained by introducing the reactive silicon group (s) (each) represented by the general formula (1) into a polyoxypropylene polymer yielded by causing propylene oxide to react in the presence of a/the composite metal cyanide complex catalyst, and yielded by using an/the initiator having, in a single molecule thereof, only one hydroxyl group together with an initiator having, in a single molecule thereof, two or more hydroxyl groups;
(XI). the organic polymer according to any one of (I) to (X), wherein the reactive silicon group(s) of the organic polymer (A) is/are (each) a methyldimethoxysilyl group;
(XII). a curable composition, comprising the organic polymer (A) recited in according to any one of (I) to (XI), and an organic polymer (B) having a number-average molecular weight of 5,000 to 50,000 and having 1.2 to 5 reactive silicon groups in each molecule of the organic polymer (B) on average;
(XIII). the curable composition according to (XII), wherein the organic polymer (B) has a main chain that is one or more selected from polyoxyalkylene polymers, polyacrylic polymers, and hydrocarbon polymers;
(XIV). the curable composition according to (XII) or (XIII), wherein the reactive silicon group (s) of the organic polymer (B) is/are (each) a methyldimethoxysilyl group;
(XV). the curable composition according to any one of (XII) to (XIV), wherein the organic polymer (B) is used in an amount of 20 to 2000 parts by weight for 100 parts by weight of the organic polymer (A);
(XVI). the curable composition according to any one of (XII) to (XV), wherein a phthalic acid ester type plasticizer is used in an amount of 1 to 20 parts by weight for 100 parts by weight of the organic polymer (A);
(XVII). a sealing material for architecture, wherein the curable composition recited in any one of (XII) to (XVI) is used;
(XVIII). a sealing material to be applied to a siding board, wherein the curable composition recited in any one of (XII) to (XVII) is used;
(XIX). a sealing material for a joining material for joining stones to each other, wherein the curable composition recited in any one of (XII) to (XVI) is used; and
(XX). a cured product obtained by curing the curable composition recited in any one of (XII) to (XVI), and having a silica sand adhesion amount of 10 mg/cm$^2$ or less, the amount being a value obtained by making an evaluation according to the following method:

an evaluating method of allowing the curable composition at 23° C. and 50% RH for 3 days, and then curing the composition at 50° C. over 4 days; applying, onto a front surface of the resultant sheet, an aqueous acrylic emulsion paint (trade name: "PLEASE COAT", SK Kaken Co., Ltd.), and further allowing the paint-applied sheet to stand still at 23° C. and 50% RH for 7 days; applying a silica sand, 67 BLACK, manufactured by Shintoh Tohryou Co., Ltd., evenly onto the surface of the sheet after the standing-still for the 7 days; and measuring, after 3 hours from the application, the adhesion amount of the silica sand per unit area (mg/cm$^2$) obtained when the silica sand is lightly brushed away with a brush.

Effect of the Invention

A curable composition having a low modulus and no staining property can be obtained by using an organic polymer made large in the proportion of molecules of this polymer each having a reactive silicon group introduced specifically only into one out of terminals thereof. Moreover, the use of this organic polymer can give a cured product having a higher elastic restorability which is suitable for use as sealing material for architecture, than the use of an organic polymer about which the proportion of reactive-silicon-group-introduced molecules of the polymer is a conventional value.

MODE FOR CARRYING OUT THE INVENTION

Hereinafter, the present invention will be described in detail.

About the reactive-silicon-group-having organic polymers (A) and (B) used or usable in the present invention, their main chain skeleton is not particularly limited. Thus, the organic polymers (A) and (B) may each be an organic polymer having a main chain skeleton that may be of various types. The main chain skeleton is preferably a skeleton made of at least one selected from hydrogen atoms, carbon atoms, nitrogen atoms, oxygen atoms, and sulfur atoms because of being superior in curability and adhesiveness of the resultant composition.

Specific examples of the polymer include polyoxyalkylene polymers such as polyoxyethylene, polyoxypropylene, polyoxybutylene, polyoxytetramethylene, and polyoxyethylene/polyoxypropylene copolymer, and polyoxypropylene/polyoxybutylene copolymer; hydrocarbon polymers such as ethylene/propylene copolymer, polyisobutylene, copolymer made from isobutylene and for example, isoprene, polychloroprene, polyisoprene, copolymer made from isoprene or butadiene and acrylonitrile and/or styrene, etc., polybutadiene, copolymer made from isoprene or butadiene and acrylonitrile and styrene, etc., and hydrogenated polyolefin polymers obtained by hydrogenating these polyolefin polymers, respectively; polyester polymers each obtained by condensing a bibasic acid such as adipic acid, and glycol, or ring-opening-polymerizing a lactone; (meth)acrylic acid ester polymers each obtained by radical-polymerizing ethyl(meth)acrylate, butyl(meth)acrylate or any other (meth)acrylate monomer; vinyl polymers each obtained by radical-polymerizing a (meth)acrylate monomer, vinyl acetate, acrylonitrile, styrene or any other vinyl monomer; graft polymers each obtained by polymerizing a vinyl monomer in any one of these organic polymers; polysulfide polymers; polyamide polymers such as nylon 6, which is obtained by ring-opening-polymerizing ε-caprolactam, nylon 6•6, which is obtained by polycondensing hexamethylenediamine and adipic acid, nylon 6•10, which is obtained by polycondensing hexamethylenediamine and sebacic acid; nylon 11, which is obtained by polycondensing ε-aminoundecanoic acid, nylon 12, which is obtained by ring-opening-polymerizing ε-aminolaurolactam, and copolymerized nylons each having two or more components of these nylons; polycarbonate polymers, for example, one produced by polycondensing bisphenol A and carbonyl chloride; and diallyl phthalate polymers.

More preferred are saturated hydrocarbon polymers such as polyisobutylene, hydrogenated polyisoprene and hydrogenated polybutadiene, polyoxyalkylene polymers, and (meth)acrylic acid ester polymers since these polymers are relatively low in glass transition temperature, and each give a cured product excellent in cold resistance.

The glass transition temperature of each of the organic polymers that are the components (A) and (B) is not particularly limited, and is preferably 20° C. or lower, more preferably 0° C. or lower, in particular preferably −20° C. or lower. If the glass transition temperature is higher than 20° C., the organic polymer may become high in viscosity in wintertime and cold districts to be deteriorated in workability. Additionally, the cured product may be lowered in flexibility to be declined in elongation. The glass transition temperature denotes a value obtained by DSC measurement.

The polyoxyalkylene polymers, and (meth)acrylic acid ester polymers are particularly preferred since the polymers are high in moisture permeability and are, when each prepared into a one-pack type product, excellent in the depth curability thereof and further the polymers are further excellent in adhesive property. The polyoxyalkylene polymers are most preferred. Among the polyoxyalkylene polymers, polyoxypropylene polymer is particularly preferred.

The reactive silicon group(s) contained in the organic polymer (A) of the present invention is/are (each) a group that has a hydroxyl group or hydrolysable group bonded to a silicon atom, and can form a siloxane bond by a reaction accelerated by a silanol condensing catalyst, so as to be crosslinkable. The reactive silicon group(s) is/are (each) represented by the following general formula (1):

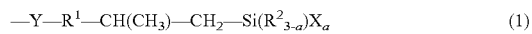

$$-Y-R^1-CH(CH_3)-CH_2-Si(R^2{}_{3-a})X_a \quad (1)$$

wherein $R^1$ represents a bivalent organic group having 1 to 20 carbon atoms and containing, as one or more constituent atoms, one or more selected from the group consisting of hydrogen, carbon and nitrogen atoms; $R^2$(s) (each) represent(s) an alkyl group having 1 to 20 carbon atoms, an aryl group having 6 to 20 carbon atoms, an aralkyl group having 7 to 20 carbon atoms, or a triorganosiloxy group represented by $-OSi(R')_3$, wherein three R's, which may be the same or different, are each a monovalent hydrocarbon group having 1 to 20 carbon atoms; X(s) (each) represent(s) a hydroxyl group or a hydrolysable group provided that when two or more Xs are present, they may be the same or different; Y is a heteroatom, and is selected from an oxygen atom or a nitrogen atom; and a is an integer of 1 to 3.

In an ordinary method for producing an organic polymer having one or more reactive silicon groups, allyl groups are introduced to terminals of a polymer, which has been made into a high molecular weight, and in a subsequent step a silane compound, such as methyldimethoxysilane or trimethoxysilane, is caused to react therewith in the presence of a platinum catalyst. At this time, about 20% of the allyl groups undergo internal isomerization so that the resultant isomer remains as a structure unreactive with any silane compound. The inventors have found out that the matter that this molecular component, into which no silicon group can be introduced, remains is a reason why stain onto the surroundings cannot be completely overcome. The present invention is an invention in which methallyl groups, which do not undergo internal isomerization, are used instead of allyl groups to overcome the above-mentioned problems. The inventors have also found out that the component (A) silylated by use of a methallyl group is characterized by being higher in elastic restorability than any component produced by a conventional production process in which silanization is attained by use of an allyl group.

Known is a technique of introducing methallyl groups into both terminals of a high molecular weight, or all terminals of a branched main chain thereof, and introducing silicon groups to substantially the whole of the terminals. In the present invention, a silicon group is introduced into one-side out of terminals of an organic polymer having a linear main chain, and the proportion of molecules (of the polymer) in each of which this silicon group is introduced is made high so that the organic polymer is heightened in performance for functioning as a reactive plasticizer. Thus, in the present polymer, the number of its silicon group(s) is preferably 0.5 or more but less than 1.2, more preferably from 0.8 to 1.1, most preferably from 0.95 to 1.05 in each molecule of the polymer on average.

The reactive silicon group(s) contained in the organic polymer (B) of the present invention is/are (each) a group that has a hydroxyl group or hydrolysable group bonded to a silicon atom, and can form a siloxane bond by reaction accelerated by a silanol condensing catalyst, so as to be crosslinkable. The reactive silicon group(s) is/are (each) represented by the following general formula (2):

$$-SiR^2{}_{3-a}X_a \quad (2)$$

wherein $R^2$(s) is/are (each independently) an alkyl group having 1 to 20 carbon atoms, an aryl group having 6 to 20 carbon atoms, an aralkyl group having 7 to 20 carbon atoms, or a triogranosiloxy group represented by —OSi(R')$_3$ wherein R's are each independently a hydrocarbon group having 1 to 20 carbon atoms; X(s) is/are (each independently) a hydroxyl group or a hydrolysable group; and further a is an integer of 1 to 3.

The hydrolysable group is not particularly limited, and may be any hydrolysable known in the prior art. Specific examples thereof include a hydrogen atom, halogen atoms; and alkoxy, acyloxy, ketoxymate, amino, amide, acid amide, aminooxy, mercapto, and alkenyloxy groups. Among these examples, preferred are a hydrogen atom, and alkoxy, acyloxy, ketoxymate, amino, amide, aminooxy, mercapto, and alkenyloxy groups. An alkoxy group is particularly preferred since this group is mildly hydrolysable to be easily handled.

One to three hydrolysable groups or hydroxyl groups can be bonded to any one silicon atom (of the reactive silicon group(s)). When two or more hydrolysable groups or hydroxyl groups are bonded into (each of) the reactive silicon group(s), these groups may be the same or different.

In each of the general formulae (1) and (2), a is preferably 2 or 3 from the viewpoint of the curability. When the organic polymer is desired to have a rapid curability, a is preferably 3. When the polymer is desired to have a storage stability, a is preferably 2.

In the general formula (1), $R^1$ is a bivalent organic group having 1 to 20 carbon atoms and containing, as one or more constituent atoms, one or more selected from the group consisting of hydrogen, carbon and nitrogen atoms. Examples thereof include —$CH_2$—, —$C_2H_4$—, —$C_3H_6$—, —$C_4H_8$—, —$C_5H_{10}$—, —$C_6H_4$—, —$C_6H_{12}$—, —$CH(CH_3)$—, —$CH_2$—$CH(CH_3)$—, —$CH_2$—$CH(CH_3)$—$CH_2$—, —$C_2H_4$—$CH(CH_3)$—, —$CH_2$—$C_6H_4$—, —$CH_2$—$C_6H_4$—$CH_2$—, and —$C_2H_4$—$C_6H_4$—. Preferred are —$CH_2$—, —$CH_2$—$CH_2$— and —$CH_2CH(CH_3)$— since organic polymers having these groups, respectively, are easily synthesized. Particularly preferred is —$CH_2$— since the raw material of an organic polymer having this group is easily available.

Specific examples of (each of) $R^2$ (s) include alkyl groups such as methyl and ethyl groups; cycloalkyl groups such as a cyclohexyl group; aryl groups such as a phenyl group; aralkyl groups such as a benzyl group; triorganosiloxy groups represented by —OSi(R')$_3$ wherein R's are each, for example, a methyl group or a phenyl group; a chloromethyl group; and a methoxymethyl group. Among these examples, a methyl group is particularly preferred.

More specific examples of (each of) the reactive silicon group(s) include trimethoxysilyl, triethoxysilyl, triisopropoxysilyl, dimethoxymethylsilyl, diethoxymethylsilyl, and diisopropoxymethylsilyl groups. More preferred are trimethoxysilyl, triethoxysilyl and dimethoxymethylsilyl groups, and particularly preferred is a dimethoxymethylsilyl group since these groups are high in activity so that the organic polymer can gain a good curability. From the viewpoint of the stability when stored, dimethoxymethylsilyl and triethoxysilyl groups are particularly preferred. About triethoxysilyl and diethoxymethylsilyl groups, an alcohol produced following hydrolysis reaction of the reactive silicon groups is ethanol. Thus, these groups are particularly preferred since organic polymers having the groups, respectively, have a higher safety.

It is advisable to conduct the introduction of the reactive silicon group(s) by a known method. Examples of the method include the following methods:

(I) An organic polymer having in the molecule thereof one or more functional groups such as a hydroxyl group is caused to react with an organic compound having one or more active groups and unsaturated groups reactive with the functional group(s) to yield an organic polymer having one or more unsaturated groups. Alternatively, it is copolymerized with an unsaturated-group-containing epoxy compound to yield an unsaturated-group-containing organic polymer. Next, a hydrosilane having a reactive silicon group is caused to act onto the resultant reaction product to subject the reaction product to hydrosilanization.

(II) An unsaturated-group-containing organic polymer yielded in the same way as in the method (I) is caused to react with a compound having a mercapto group and a reactive silicon group.

(III) An organic polymer having in the molecule thereof a functional group such as a hydroxyl, epoxy or isocyanate group is caused to react with a compound having a functional group reactive with the former functional group, and a reactive silicon group.

Among these methods, preferred is the method (I), or one type of the method (III) wherein a polymer having at its terminal a hydroxyl group is reacted with a compound having an isocyanate group and a reactive silicon group since these give a high conversion rate in a relatively short reaction time. Furthermore, the method (I) is particularly preferred since the reactive-silicon-group-having organic polymer yielded in the method (I) is to be made up to a composition lower in viscosity to be better in workability than the organic polymer yielded by the method (III) and further the organic polymer yielded by the method (II) emits a strong smell based on a mercaptosilane.

Specific examples of the hydrosilane compound used in the method (I) include, but not limited to, halogenated silanes such as trichlorosilane, methyldichlorosilane, dimethylchlorosilane, and phenyldichlorosilane; alkoxysilanes such as trimethoxysilane, triethoxysilane, methyldiethoxysilane, methyldimethoxysilane, phenyldimethoxysilane, and 1-[2-(trimethoxysilyl)ethyl]-1,1,3,3-tetramethyldisiloxane; acyloxysilanes such as methyldiacetoxysilane, and phenyldiacetoxysilane; and ketoxymate silanes such as bis(dimethylketoxymate)methylsilane, and bis(cyclohexylketoxymate)methylsilane. Among these examples, halogenated silanes and alkoxysilanes are particularly preferred, and alkoxysilanes are most preferred since these silanes each give, particularly, a curable composition that is mildly hydrolyzed to be easily handled. Among the alkoxysilanes, methyldimethoxysilane is preferred since it is easily available and a curable composition containing the resultant organic polymer is high in curability, storage stability, elongation property, and tensile strength. Trimethoxysilane is particularly preferred from the viewpoint of the curability and elastic restorability of the resultant curable composition.

The synthesis method (II) is not particularly limited, and is, for example, a method of introducing a compound having a mercapto group and a reactive silicon group into an unsaturated bond site of an organic polymer by radical addition reaction in the presence of a radical initiator and/or a radical generating source. Specific examples of the compound having a mercapto group and a reactive silicon group include γ-mercaptopropyltrimethoxysilane, γ-mercaptopropylmethyldimethoxysilane, γ-mercaptopropyltriethoxysilane, γ-mercaptopropylmethyldiethoxysilane, mercaptomethyltrimethoxysilane, and mercaptomethyltriethoxysilane. However, the compound is not limited thereto.

Among manners the synthesis method (III), the manner of causing a polymer having at its terminal a hydroxyl group to react with a compound having an isocyanate group and a reactive silicon group is not particularly limited, and is, for example, a manner disclosed in JP-A-3-47825. Specific examples of the compound having an isocyanate group and a reactive silicon group include γ-isocyanatopropyltrimethoxysilane, γ-isocyanatopropylmethyldimethoxysilane, γ-isocyanatopropyltriethoxysilane, γ-isocyanatopropylmethyldiethoxysilane, isocyanatomethyltrimethoxysilane, isocyanatomethyltriethoxysilane, isocyanatomethyldimethoxymethylsilane, and isocyanatomethyldiethoxymethylsilane. However, the compound is not limited thereto.

Among manners for the synthesis method (III), the manner of causing a polymer having at its terminal an isocyanate group to react with a compound having an amino group and a reactive silicon group is not particularly limited, and is, for example, a manner disclosed in JP-A-2005-2115. Specific examples of the compound having an amino group and a reactive silicon group include γ-aminopropyltrimethoxysilane, γ-aminopropyltriethoxysilane, γ-aminopropylmethyldimethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, N-phenyl-γ-aminopropyltrimethoxysilane, N-ethyl-3-amino-isobutyltrimethoxysilane, N-ethyl-3-amino-isobutyltriethoxysilane, and N-ethyl-3-amino-isobutyldimethoxymethylsilane. However, the compound is not limited thereto. Among these examples, N-ethyl-3-amino-isobutyltrimethoxysilane is commercially available as a product (trade name: Silquest A-Link 15 Silane) from Momentive Performance Materials Inc., and is suitable for the preparation of the component (A).

About a silane compound in which three hydrolysable groups are bonded onto a single silicon atom of, for example, trimethoxysilane, a disproportionate reaction thereof may advance. When the disproportionate reaction advances, an instable compound such as dimethoxysilane is generated so that the reaction system may not be easily handled. However, about γ-mercaptopropyltrimethoxysilane or γ-isocyanatopropyltrimethoxysilane, such a disproportionate reaction does not advance. Thus, in the case of using, as the silicon-containing group, a group in which three hydrolysable groups are bonded onto a single silicon atom, it is preferred to use the synthesis method (II) or (III).

About a compound represented by the following general formula (3), no disproportionate reaction advances:

$$H-(SiR^3{}_2O)_mSiR^3{}_2-R^4-SiX_3 \quad (3)$$

wherein X is the same as described above; $R^3$s, the number of which is "2 m+2", are each independently a hydrocarbon group, and is preferably a hydrocarbon group having 1 to 20 carbon atoms, more preferably a hydrocarbon group having 1 to 8 carbon atoms, in particular preferably a hydrocarbon group having 1 to 4 carbon atoms from the viewpoint of the availability (of the compound) and costs; $R^4$ is a bivalent organic group, and is preferably a bivalent hydrocarbon group having 1 to 12 carbon atoms, more preferably a bivalent hydrocarbon group having 2 to 8 carbon atoms, in particular preferably a bivalent hydrocarbon group having 2 carbon atoms from the viewpoint of the availability and costs; and m is an integer of 0 to 19, and is preferably 1 from the viewpoint of the availability and costs. For this reason, in the case of introducing a group in which three hydrolysable groups are bonded onto a single silicon atom in the synthesis method (I), it is preferred to use a silane compound represented by the general formula (3). Specific examples of the silane compound represented by the general formula (3) include 1-[2-(trimethoxysilyl)ethyl]-1,1,3,3-tetramethyldisiloxane, 1-[2-(trimethoxysilyl)propyl]-1,1,3,3-tetramethyldisiloxane, and 1-[2-(trimethoxysilyl)hexyl]-1,1,3,3-tetramethyldisiloxane.

The reactive-silicon-group-having organic polymers (A) and (B) may each be in a linear form, or may be branched. In order to produce the advantageous effect of the present invention more satisfactorily, the polymers (A) and (B) are each desirably in a linear form. The number-average molecular weight of the component (A) is from about 800 to 15,000, more preferably from 1,000 to 13,000, in particular preferably from 2,000 to 11,000 in terms of that of polystyrene according to GPC. If the number-average molecular weight of the component (A) is less than 800, the advantageous effect of overcoming the staining property tends to be insufficient and further an unfavorable result is caused from the viewpoint of costs. If the molecular weight is more than 15,000, the polymer becomes high in viscosity so that for the workability thereof an inconvenience tends to be caused.

Then, the number-average molecular weight of the component (B) is from about 5,000 to 50,000, more preferably from about 8,000 to 30,000, in particular preferably from about 10,000 to 25,000, the molecular weight being measured according to the same method as described above. If the number-average molecular weight of the component (B) is less than 5,000, the cured product is low in elongation to tend not to be suitable for a sealing material for architecture. If the molecular weight is more than 30,000, the curable composition becomes high in viscosity to be poor in workability, particularly, at low temperatures. Thus, when the cured product is used as a sealing material for architecture, a problem called "cobwebbing" is unfavorably caused.

In the present invention, the number-average molecular weight of the polymer(s) contained in the curable composition is gained about its peak or each of their peaks in a GPC chart thereof. When plural initiators are used, plural polymers can be obtained by a single polymerization operation. In this case, the number-average molecular weight of the whole of the polymers is not calculated but the number-average molecular weight of each of the polymers is gained. In short, the number-average molecular weight is gained about each of their peaks.

The plasticizer in the present invention can act instead of an ordinary plasticizer. In order not to cause a staining problem, it is preferred that the reactive silicon group contained in the organic polymer (A) is present only at one out of terminals of the polymer. It is further desired that the proportion of any component containing no silicon group is as small as possible. In other words, it is desired that the number of the reactive silicon group(s) contained in the organic polymer (A) is approximately one.

Meanwhile, the number of the reactive silicon group(s) contained in the organic polymer (B) is desirably from 1.2 to 5, preferably from 1.3 (inclusive) to 3, more preferably from 1.4 to 2 in each molecule of the polymer on average.

As described above, the organic polymer (A) has a structure in which the organic polymer has, at one out of terminals of the organic polymer, the reactive silicon group(s). The organic polymer (A) is characterized by being a polymer in which its reactive silicon group(s) is/are introduced only into one of both its terminals, and having a structural formula as represented by the general formula (1) to heighten the proportion of molecules in each of which this silicon group is introduced. Thus, for the organic polymer (A), it is necessary to take a synthesis method of attaining the introduction of the silicon group(s) only into the one of the terminals as much as possible.

Specifically, it is preferred to use, as the organic polymer used in the above-mentioned item (I), an organic polymer having in a single molecule thereof only one active hydrogen atom of a hydroxyl group or some other group. For producing the component (A) in an actual machine, when an organic polymer having in a single molecule thereof only one active hydrogen atom is used as an initiator, if the charged amount of the polymer is so small that a sufficient stirring/diffusion of the polymer is not ensured, a compound having in a single molecule thereof two or more active hydrogen atoms may be used together. In such a case, organic polymers each having, in each molecule thereof, two reactive silicon groups on average are intermingled; however, no problem is caused as far as the number of the reactive silicon group(s) in each of the molecules of the intermingled polymers is adjusted to less than one on average.

Examples of the initiator having in a single molecule thereof only one active hydrogen atom are the following compounds: primary, secondary and tertiary alcohols such as methanol, ethanol, propanol, butanol, pentanol, hexanol, heptanol, octanol, nonanol and decanol; monovalent-unsaturated-group-containing alcohols such as allyl alcohol, methallyl alcohol, and propenyl alcohol; and monovalent-unsaturated-group-containing alcohols, such as a monoallyl-etherized product of ethylene glycol, diethylene glycol, propylene glycol, dipropylene glycol, 1,3-propanediol, neopentyl glycol, 1,4-butanediol, 1,5-pentanediol, 1,6-hexanediol, 1,4-cyclohexanediol or the like, which is obtained by monoallyl-etherizing the above-mentioned diol, a monovinyl-etherized product of the above-mentioned diol, which is obtained by monovinyl-etherizing the above-mentioned diol, and monovalent saturated alcohols, such as a monoalkyl-etherized product of the above-mentioned diol, which is obtained by monoalkyl-etherizing the above-mentioned diol. However, the initiator is not limited thereto. The kind of the active hydrogen group is preferably any alcohol from the viewpoint of reactivity and availability. Any alcohol having 3 to 7 carbon atoms is most preferred. Any alcohol having 1 to 2 is unsuitable for the initiator since the alcohol has a low boiling point not to become stable easily in a liquid form. Any alcohol having 8 or more carbon atoms tends to be low in reactivity when one or more reactive silicon groups are introduced into the obtained organic polymer. Among alcohols, n-butanol is most preferred.

As described above, the use of a low molecular weight alcohol may cause a problem when the organic polymer of the present invention is produced in an actual machine. In such a case, it is convenient to use a polyether polymer having at one-side out of terminals thereof a hydroxyl group. The molecular weight thereof may be from about 1,000 to 5,000. For example, a polyoxypropylene monobutyl ether (trade name: NEW POLE) manufactured by Sanyo Chemical Industries, Ltd. is preferably usable.

When such an initiator is used to synthesize an organic polymer, the obtained organic polymer can be an organic polymer having a high content by percentage of components each having in a single molecule thereof one reactive silicon group.

The reactive silicon group (s) may be present at a terminal of the main chain of the molecular chain of the organic polymer, or a terminal of a side chain thereof, or may be at these two terminals. When the reactive silicon group(s) is/are present only at a terminal of the main chain of the molecular chain, the effective network length of the organic polymer component contained in the finally formed cured product becomes long so that this cured product can be favorably obtained with ease as a rubbery cured product high in strength and elongation and low in elastic modulus.

Each of the above-mentioned polyoxyalkylene polymers is essentially a polymer having recurring units each represented by the following general formula (4):

wherein $R^5$ is a linear or branched alkylene group having 1 to 14 carbon atoms. In the general formula (4), $R^5$ is preferably a linear or branched alkylene group having 1 to 14 carbon atoms, more preferably 2 to 4 carbon atoms. Specific examples of each of the recurring units represented by the general formula (4) include —$CH_2O$—, —$CH_2CH_2O$—, —$CH_2CH(CH_3)O$—, —$CH_2CH(CH_2H_5)O$—, —$CH_2C(CH_3)_2O$—, and —$CH_2CH_2CH_2CH_2O$—. The main chain skeleton of the polyoxyalkylene polymer may be composed of recurring units of only one type, or recurring units of two or more types. When the curable composition of the present invention is used particularly as, for example, a sealing material, the composition is preferably a composition made of polymers made mainly of propylene oxide polymer since the polymer is amorphous and has a relatively low viscosity.

Examples of a method for synthesizing the polyoxyalkylene polymer include, but not limited to a polymerization method using an alkali catalyst such as KOH, a polymerization method disclosed in JP-A-61-215623, using a transition metal compound/porphyrin complex catalyst, such as a complex obtained by reacting an organic aluminum compound with porphyrin, a polymerization method disclosed in JP-B-46-27250, JP-B-59-15336, U.S. Pat. Nos. 3,278,457, 3,278,458, 3,278,459, 3,427,256, 3,427,334 and 3,427,335, and others, using a composite metal cyanide complex catalyst, a polymerization method demonstrated in JP-A-10-273512, using a catalyst made of a polyphosphazene salt, and a polymerization method demonstrated in JP-A-11-060722, using a catalyst made of a phosphazene compound.

Examples of a method for producing a polyoxyalkylene polymer having a reactive silicon group include methods suggested in each of JP-B-45-36319, JP-B-46-12154, JP-A-50-156599, JP-A-54-6096, JP-A-55-13767, JP-A-55-13468, JP-A-57-164123, JP-B-3-2450, and U.S. Pat. Nos. 3,632,557, 4,345,053, 4,366,307 and 4,960,844; and polyoxyalkylene polymers suggested in each of JP-A-61-197631, JP-A-61-215622, JP-A-61-215623, JP-A-61-218632, JP-A-3-72527, JP-A-3-47825 and JP-A-8-231707, having a number-average molecular weight of 6,000 or more, and an MW/Mn of 1.6 or less, which is high in molecular weight and narrow in molecular weight distribution. However, the method is not limited thereto.

The polyoxyalkylene polymer having a reactive silicon group may be used alone, or in combination of two or more thereof.

Each of the above-mentioned saturated hydrocarbon polymers is a polymer which does not substantially contain a carbon-carbon unsaturated bond other than ones in any aromatic ring. A polymer constituting the skeleton thereof can be obtained by, for example, a method (1) of polymerizing an olefin compound having 2 to 6 carbon atoms, such as ethylene, propylene, 1-butene, or isobutylene, as a main monomer, or a method (2) of homo-polymerizing a diene compound, such as butadiene or isoprene, or copolymerizing a diene compound with an olefin compound as described above, and then hydrogenating the resultant homopolymer or copolymer. An isobutylene polymer or a hydrogenated polybutadiene polymer is preferred since a functional group can easily be introduced into the polymer, the molecular weight thereof can easily be controlled and further the number of its terminal functional groups can be increased. An isobutylene polymer is particularly preferred.

A polymer having a main skeleton that is a saturated hydrocarbon polymer is characterized by being excellent in heat resistance, weather resistance, endurance, and moisture blocking performance.

The isobutylene polymer may be a polymer the monomer units of which are wholly isobutylene units, or a copolymer made from isobutylene and another monomer. From the viewpoint of rubber properties, the isobutylene polymer is preferably a polymer containing recurring units originating from isobutylene in a proportion of 50% by weight or more, more preferably 80% by weight or more, in particular preferably from 90 to 99% by weight.

As a method for synthesizing the saturated hydrocarbon polymer, various polymerization methods have been hitherto reported. The so-called living polymerization has been developed, particularly, in recent years. The saturated hydrocarbon polymer, particularly, the isobutylene polymer can easily be produced, using iniferter polymerization found out by Kennedy at al. (J. P. Kennedy et al., J. Polymer Sci., Polymer Chem., Ed. 1997, vol. 15, p. 2843). It is known that polymerization can be attained to give a polymer having a molecular weight of about 500 to 100,000, and a molecular weight distribution of 1.5 or less, and a functional group that may be of various types may be introduced into a molecular terminal thereof.

A method for producing a saturated hydrocarbon polymer having a reactive silicon group is described in, for example, JP-B-4-69659, JP-B-7-108928, JP-A-63-254149, JP-A-64-22904, JP-A-1-197509, JP 2539445 B1 and JP 2873395 B1, and JP-A-7-53882. The method is not particularly limited thereto.

The saturated hydrocarbon polymer having a reactive silicon group may be used alone, or in combination of two or more thereof.

A (meth)acrylate monomer constituting the main chain of each of the above-mentioned (meth)acrylic acid ester polymers is not particularly limited, and may be of various types. Examples thereof include (meth)acrylic acid, methyl(meth)acrylate, ethyl(meth)acrylate, n-propyl(meth)acrylate, isopropyl(meth)acrylate, n-butyl(meth)acrylate, isobutyl(meth)acrylate, tert-butyl(meth)acrylate, n-pentyl(meth)acrylate, n-hexyl(meth)acrylate, cyclohexyl(meth)acrylate, n-heptyl(meth)acrylate, n-octyl(meth)acrylate, 2-ethylhexyl(meth)acrylate, nonyl(meth)acrylate, decyl(meth)acrylate, dodecyl(meth)acrylate, phenyl(meth)acrylate, toluoyl(meth)acrylate, benzyl(meth)acrylate, 2-methoxyethyl(meth)acrylate, 3-methoxybutyl(meth)acrylate, 2-hydroxyethyl(meth)acrylate, 2-hydroxypropyl(meth)acrylate, stearyl(meth)acrylate, glycidyl(meth)acrylate, 2-aminoethyl(meth)acrylate, γ-(methacryloyloxy)propyltrimethoxysilane, γ-(methacryloyloxy)propyldimethoxymethylsilane, methacryloyloxymethyltrimethoxysilane, methacryloyloxymethyltriethoxysilane, methacryloyloxymethyldimethoxymethylsilane, methacryloyloxymethyldiethoxymethylsilane, an ethylene oxide adduct of (meth)acrylic acid, and other (meth)acrylic acid monomers.

For each of the above-mentioned (meth)acrylic acid ester polymers, a vinyl monomer can be copolymerized with the (meth)acrylate monomer, examples of the vinyl monomer including: styrene based monomers such as styrene, vinyltoluene, α-methylstyrene, chlorostyrene, styrenesulfonic acid, and a salt thereof; silicon-containing vinyl monomers such as vinyltrimethoxysilane, and vinyltriethoxysilane; maleic anhydride, maleic acid, and monoalkyl esters and dialkyl esters of maleic acid; fumaric acid, and monoalkyl esters and dialkyl esters of fumaric acid; maleimide based monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile-group-containing vinyl monomers such as acrylonitrile and methacrylonitrile; amide-group-containing vinyl monomers such as acrylamide, and methacrylamide; vinyl esters such as vinyl acetate, vinyl propionate, vinyl pivalate, vinyl benzoate, and vinyl cinnamate; alkenes such as ethylene and propylene; conjugated dienes such as butadiene, and isoprene; and vinyl chloride, vinylidene chloride, allyl chloride, and allyl alcohol.

These may be used alone, or two or more thereof may be copolymerized with each other. Particularly preferred are polymers made from styrene based monomers and (meth)acrylic acid based monomers, respectively, from the viewpoint of physical properties of the product, and others. More preferred are (meth)acrylic polymers made from acrylate monomers, and methacrylate monomers, respectively. Particularly preferred are acrylic polymers made from respective acrylate monomers. Butyl acrylate based monomers are more preferred since a blend for general architecture or some other is required to be low in viscosity, and a cured product therefor is required to be low in modulus, and high in elongation, weather resistance, heat resistance and others. For articles required to have oil resistance and others for automobiles or others, a copolymer made mainly from ethyl acrylate is further preferred. Although this polymer made mainly from ethyl acrylate is excellent in oil resistance, the polymer is slightly poor in low-temperature property (cold resistance). Thus, in order to improve the low-temperature property, a part of ethyl acrylate may be substituted with butyl acrylate. However, with an increase in the proportion of butyl acrylate, the good oil resistance is damaged bit by bit. Thus, for articles required to have oil resistance, the proportion is preferably 40% or less, more preferably 30% or less. In order to improve the low-temperature property and others without damaging the oil resistance, it is also preferred to use, for example, 2-methoxyethyl acrylate or 2-ethoxyethyl acrylate, in which oxygen is introduced into the alkyl group of its side chain. However, the introduction of an alkoxy group, which has an ether bond in the side chain, tends to make the heat resistance poor; thus, when the final product is required to have heat resistance, it is preferred that the proportion is set to 40% or less. In accordance with an article in which the curable composition of the present invention is used, which may be of various types, or a purpose required by the article, the proportion may be varied to give an appropriate polymer, considering physical properties to be needed, such as oil resistance, heat resistance, and low-temperature property. An example (of the polymer) excellent in balance between physical properties such as oil resistance, heat resistance and low-temperature property is a copolymer of ethyl acrylate/butyl acrylate/2-methoxyethyl acrylate (ratio by weight=40-50/20-30/30-20) although an excellent example thereof is not limited thereto. In the present invention, such one or more preferred monomers may be copolymerized with another monomer, and may be block-copolymerized therewith. At this time, it is preferred that the copolymer contains the preferred monomer(s) in a proportion of 40% by weight or more. In the above-mentioned expression style, for example, the wording "(meth)acrylic acid" denotes acrylic acid and/or methacrylic acid.

The method for synthesizing the (meth)acrylic acid ester polymer is not particularly limited, may be a known method. However, such a polymer that is obtained by an ordinary free radical polymerization method using, for example, an azo compound or peroxide as a polymerization initiator generally has a large molecular weight distribution of 2 or more to have a problem of being high in viscosity. Accordingly, it is preferred to use a living radical polymerization method in order to obtain, with a high probability, a low-viscosity (meth) acrylic acid ester polymer having at a terminal of its molecular chain a crosslinkable functional group.

Among "living radical polymerization methods", the following is further preferred as the method for producing a (meth)acrylic acid ester polymer having a specified functional group: an "atom transfer radical polymerization method" of polymerizing a (meth)acrylic acid ester monomer using, for example, an organic halide or a halogenated sulfonyl compound as an initiator, and using a transition metal complex as a catalyst. This is because this method has characteristics of the "living radical polymerization methods", and additionally the method has at the terminal a halogen or the like, which is relatively favorable for a functional group converting reaction and is large in flexibility for the design of the initiator or the catalyst. This atom transfer radical polymerization method is given in, for example, Matyjaszewski et al., Journal of American Chemical Society (J. Am. Chem. Soc.), 1995, vol. 117, p. 5614.

As a method for producing the (meth)acrylic acid ester polymer having a reactive silicon group, for example, JP-B-3-14068, JP-B-4-55444, JP-A-6-211922, and others disclose a producing method using a free radical polymerization method using a chain transfer agent. JP-A-9-272714 and others disclose a producing method using an atom transfer radical polymerization method. However, the polymer producing method is not particularly limited thereto. The (meth) acrylic acid ester polymer having a reactive silicon group may be used alone or in combination of two or more thereof.

Such a reactive-silicon-group-having organic polymer may be used alone or in combination of two or more thereof. Specifically, it is allowable to use an organic polymer made of a blend of two or more selected from the group consisting of reactive-silicon-group-having polyoxyalkylene polymers, reactive-silicon-group-having saturated hydrocarbon polymers, and reactive-silicon-group-having (meth)acrylic acid ester polymers.

A method for producing an organic polymer made of a blend of a reactive-silicon-group-having polyoxyalkylene polymer and a reactive-silicon-group-having (meth)acrylic acid ester polymer is suggested in JP-A-59-122541, JP-A-63-112642, JP-A-6-172631, JP-A-11-116763, and others. However, the method is not limited thereto. A preferred specific example thereof is a method of blending a reactive-silicon-group-having polyoxyalkylene polymer with a reactive-silicon-group-having copolymer having a molecular chain composed substantially of (meth)acrylic acid ester monomer units each having an alkyl group having 1 to 8 carbon atoms and represented by the following general formula (5):

  (5)

wherein $R^6$ represents a hydrogen atom or a methyl group, and $R^7$ represents the alkyl group having 1 to 8 carbon atoms, and (meth)acrylic acid ester monomer units each having an alkyl group having 9 or more carbon atoms and represented by the following general formula (6):

  (6)

wherein $R^6$ is the same as described above, and $R^8$ represents the alkyl group having 9 or more carbon atoms.

In the general formula (5), $R^7$ may be an alkyl group having 1 to 8, preferably 1 to 4 carbon atoms, more preferably 1 or 2 carbon atoms, such as a methyl, ethyl, propyl, n-butyl, t-butyl, or 2-ethylhexyl group. The alkyl group as $R^7$ (in the unit) may be alone or two or more thereof may be mixed.

In the general formula (6), $R^8$ may be a long-chain alkyl group having 9 or more, usually 10 to 30 carbon atoms, preferably 10 to 20 carbon atoms, such as a nonyl, decyl, lauryl, tridecyl, cetyl, stearyl or behenyl group. As in the case of $R^7$, the alkyl group as $R^8$ (in the unit) may be alone or two or more thereof may be mixed.

The molecular chain of this (meth)acrylic acid ester polymer is composed substantially of the monomer units of the general formulae (5) and (6). The word "substantially" referred to herein means that the total proportion of the monomer units of the general formulae (5) and (6) present in the present copolymer is more than 50% by weight. The total proportion of the monomer units of the general formulae (5) and (6) is preferably 70% by weight or more.

About the presence ratio between the monomer units of the general formula (5) and the monomer units of the general formula (6), the ratio by weight of the former to the latter is preferably from 95/5 to 40/60, more preferably from 90/10 to 60/40.

Examples of a monomer unit that may be contained in the copolymer except those represented by the general formulae (5) and (6) include acrylic acids such as acrylic acid, and methacrylic acid; monomers containing amide groups such as acrylamide, methacrylamide, N-methylolacrylamide, and N-methylolmethacrylamide, monomers containing epoxy groups such as glycidyl acrylate, and glycidyl methacrylate, or monomers containing amino groups such as diethylaminoethyl acrylate, diethylaminoethyl methacrylate, and aminoethyl vinyl ether; and other monomer units each originating from, for example, acrylonitrile, styrene, α-methylstyrene, alkyl vinyl ethers, vinyl chloride, vinyl acetate, vinyl propionate, or ethylene.

An organic polymer made of a blend of a reactive-silicon-group-having saturated hydrocarbon polymer and a reactive-silicon-group-having (meth)acrylic acid ester polymer is suggested in, for example, JP-A-1-168764, JP-A-2000-186176, and others. However, the organic polymer is not particularly limited thereto.

A different usable example of the method for producing an organic polymer made of a blend of a reactive-silicon-group-having (meth)acrylic acid ester polymer and another polymer is a method of polymerizing a (meth)acrylic acid ester monomer in the presence of a reactive-silicon-group-having organic polymer. This producing method is specifically disclosed in JP-A-59-78223, JP-A-59-168014, JP-A-60-228516, JP-A-60-228517, and others. However, the method is not limited thereto.

As far as the advantageous effects of the present invention are not largely damaged, the organic polymer may contain, in its main chain skeleton, any other component such as a urethane bond component.

The urethane bond component is not particularly limited, and may be, for example, a group generated by reaction between an isocyanate group and an active hydrogen group (hereinafter the produced group may be also referred to as an amide segment).

The amide segment is a group represented by the following general formula (7):

  (7)

wherein $R^9$ represents an organic group or a hydrogen atom.

Specific examples of the amide segment include a urethane group produced by reaction between an isocyanate group and a hydroxyl group; a urea group produced by reaction between an isocyanate group and an amino group; and a thiourethane group produced by reaction between an isocyanate group and a mercapto group. In the present invention, examples of the group of the general formula (7) also include groups produced by reacting an isocyanate group with active hydrogen atoms in the urethane, urea, and thiourethane groups.

An example of an industrially-easily-attainable method for producing an organic polymer having an amide segment and one or more reactive silicon groups is a method of causing an excessive amount of a polyisocyanate compound to react with an organic polymer having at its terminal an active-hydrogen-containing group to yield a polymer having a polyurethane-based main chain a terminal of which has an isocyanate group, subsequently or simultaneously causing the isocyanate groups (of molecules of this polymer) wholly or partially to react with a W group of a silicon compound represented by the following general formula (8):

$$W-R^{10}-SiR^2{}_{3-a}X_a \qquad (8)$$

wherein $R^2$, X, and a are the same as described above; $R^{10}$ is a bivalent organic group, and is more preferably a hydrocarbon group having 1 to 20 carbon atoms; W is an active-hydrogen-containing group selected from hydroxyl, carboxy, mercapto, and (primary or secondary) amino groups. Examples of a known organic-polymer-producing method related to this producing method include those disclosed in JP-B-46-12154 (U.S. Pat. No. 3,632,557), JP-A-58-109529 (U.S. Pat. No. 4,374,237), JP-A-62-13430 (U.S. Pat. No. 4,645,816), JP-A-8-53528 (EP 0676403), JP-A-10-204144 (EP 0831108), JP-A-2003-508561 (U.S. Pat. No. 6,197,912), JP-A-6-211879 (U.S. Pat. No. 5,364,955), JP-A-10-53637 (U.S. Pat. No. 5,756,751), JP-A-11-100427, JP-A-2000-169544, JP-A-2000-169545, JP-A-2002-212415, JP 3313360 B1, U.S. Pat. No. 4,067,844, U.S. Pat. No. 3,711,445, and JP-A-2001-323040.

Another example thereof is a method of causing an organic polymer having at its terminal an active-hydrogen-containing group to react with a reactive-silicon-group-having isocyanate compound represented by the following general formula (9):

$$O=C=N-R^{10}-SiR^2{}_{3-a}X_a \qquad (9)$$

wherein $R^{10}$, $R^2$, X and a are the same as described above. Examples of a known organic-polymer-producing method related to this producing method include methods disclosed in JP-A-11-279249 (U.S. Pat. No. 5,990,257), JP-A-2000-119365 (U.S. Pat. No. 6,046,270), JP-A-58-29818 (U.S. Pat. No. 4,345,053), JP-A-3-47825 (U.S. Pat. No. 5,068,304), JP-A-11-60724, JP-A-2002-155145, JP-A-2002-249538, WO 03/018658, and WO 03/059981.

Examples of the organic polymer having at its terminal an active-hydrogen-containing group include oxyalkylene polymers each having at its terminal a hydroxyl group (polyether polyols), polyacrylic polyols, polyester polyols, saturated hydrocarbon polymers each having at its terminal a hydroxyl group (polyolefin polyols), polythiol compounds, and polyamine compounds. Among these examples, preferred are polyether polyols, polyacrylic polyols, and polyolefin polyols since respective organic polymers to be obtained are relatively low in glass transition temperature so that respective cured products to be obtained are excellent in cold resistance. In particular, polyether polyols are particularly preferred since respective organic polymers to be obtained are low in viscosity to be good in workability and are good in depth curability and adhesive property. Polyacrylic polyols and saturated hydrocarbon polymers are more preferred since cured products of respective organic polymers to be obtained are good in weather resistance and heat resistance.

Any polyether polyol produced by any producing method may be used, and preferred are polymers each having at its terminals hydroxyl groups the number of which is at least 0.7 per terminal of the molecule thereof on average of the entire molecules. Specific examples thereof are oxyalkylene polymers each produced using a conventional alkali metal catalyst, or produced by causing an alkylene oxide to react with an initiator such as a polyhydroxy compound having at least two hydroxyl groups in the presence of a composite metal cyanide complex or cesium.

Among these polymerization methods, the polymerization method using a composite metal cyanide complex is preferred since the method can give an oxyalkylene polymer that is lower in unsaturated degree, narrow in Mw/Mn, lower in viscosity, and higher in acid resistance and weather resistance.

The polyacrylic polyols may each be a polyol having as its skeleton an alkyl(meth)acrylate (co)polymer and further having in the molecule thereof a hydroxyl group. The method for synthesizing this polymer is preferably a living radical polymerization method since the method can give a polymer that is narrow in molecular weight distribution and can be made low in viscosity. An atom transfer radical polymerization is more preferred. It is also preferred to use a polymer described in JP-A-2001-207157, which is obtained through the so-called SGO process, i.e., a polymer obtained by subjecting an alkyl acrylate monomer to continuous bulk polymerization at high temperature and high pressure. A specific example thereof is a polymer ARUFON UH-2000 manufactured by Toagosei Co., Ltd.

Specific examples of the above-mentioned polyisocyanate compound include aromatic polyisocyanates such as toluene (tolylene)diisocyanate, diphenylmethane diisocyanate, and xylylene diisocyanate; and aliphatic polyisocyanates such as isophorone diisocyanate, and hexamethylene diisocyanate.

The silicon compound of the general formula (8) is not particularly limited, and specific examples thereof include amino-group-containing silanes such as γ-aminopropyltrimethoxysilane, N-(β-aminoethyl)-γ-aminopropyltrimethoxysilane, (N-phenyl)-γ-aminopropyltrimethoxysilane, N-ethylaminoisobutyltrimethoxysilane, N-cyclohexylaminomethyltriethoxysilane, N-cyclohexylaminomethyldiethoxylmethylsilane, and N-phenylaminomethyltrimethoxysilane; hydroxyl-group-containing silanes such as γ-hydroxypropyltrimethoxysilane; and mercapto-group-containing silanes such as γ-mercaptopropyltrimethoxysilane. Moreover, the following may be also used as the silicon compound of the general formula (8): a Michael addition reaction product made from an α,β-unsaturated carbonyl compound that may be of various types, and a primary-amino-group-containing compound, or a Michael addition reaction product made from a (meth)acryloyl-group-containing silane that may be of various types and a primary-amino-group-containing compound, as described in JP-A-6-211879 (U.S. Pat. No. 5,364,955), JP-A-10-53637 (U.S. Pat. No. 5,756,751), JP-A-10-204144 (EP 0831108), JP-A-2000-169544, and JP-A-2000-169545.

The reactive-silicon-group-containing isocyanate compound of the general formula (9) is not particularly limited. Specific examples thereof include γ-trimethoxysilylpropylisocyanate, γ-triethoxysilylpropylisocyanate, γ-methyldimethoxysilylpropylisocyanate, γ-methyldiethoxysilylpropylisocyanate, trimethoxysilylmethylisocyanate, triethoxymethylsilylmethylisocyanate, dimethoxymethylsilylmethylisocyanate, and diethoxymethylsilylmethylisocyanate. As described in JP-A-2000-119365 (U.S. Pat. No. 6,046,270), the following is also usable as the reactive-silicon-group-containing isocyanate compound of the general formula (9): a compound obtained by causing the silicon compound of the general formula (8) to react with an excessive amount of the above-mentioned polyisocyanate compound.

The organic polymer obtained by the method described hereinbefore has in its main chain a group represented by the following general formula (10):

$$-NR^{11}-C(=O)- \qquad (10)$$

wherein $R^{11}$ represents a hydrogen atom or a substituted or unsubstituted organic group. This structure is desirable since the structure is relatively high in polarization to tend to enhance a strength of a cured product or an adhesive property thereof onto a base material or member.

The use amount of the component (B) is preferably from about 20 to 2000 parts by weight, more preferably from about 100 to 1000 parts by weight, in particular preferably from about 120 to 700 parts by weight for 100 parts by weight of the component (A). If the component (B) is below this range, the cured product becomes too soft to produce a sealing material or adhesive having a necessary and sufficient strength. If the component (B) is more than this range, the curable composition is deteriorated in workability. Additionally, a cured product thereof becomes high in modulus. Thus, when the cured product as a working joint is largely elongated, the product is easily broken. As a result, the product is unsuitable (as the joint).

In the curable composition of the present invention, a silanol condensing catalyst is used. A typical example of the silanol condensing catalyst is an organic tin curing catalyst. Specific examples of the organic tin catalyst include dimethyltin diacetate, dimethyltin bis(acetylacetonate), dibutyltin dilaurate, dibutyltin maleate, dibutyltin phthalate, dibutyltin dioctanoate, dibutyltin bis(2-ethyl hexanoate), dibutyltin bis(methyl maleate), dibutyltin bis(ethylmaleate), dibutyltinbis(butylmaleate), dibutyltin bis(octyl maleate), dibutyltin bis(tridecyl maleate), dibutyltin bis(benzyl maleate), dibutyltin diacetate, dioctyltinbis(ethylmaleate), dioctyltin bis(octyl maleate), dibutyltin dimethoxide, dibutyltin bis(nonylphenoxide), dibutenyltin oxide, dibutyltin oxide, dibutyltin bis(acetylacetonate), dibutyltin bis(ethyl acetoacetonate), a reaction product made from dibutyltin oxide and a silicate compound, a reaction product made from dibutyltin oxide and a phthalate, dioctyltin dilaurate, dioctyltin diacetate, dioctyltin bis(acetylacetonate), and other tetravalent organic tin compounds. However, the catalyst is not limited thereto.

A curing catalyst other than the organic tin catalyst is usable. Specific examples thereof include titanium compounds such as tetrabutyl titanate, tetrapropyl titanate, titanium tetrakis(acetylacetonate), bis(acetylacetonate)diisopropoxytitanium, and diisopropoxytitanium bis(ethyl acetoacetate); organic aluminum compounds such as aluminum tris(acetylactonate), aluminum tris(ethyl acetoacetate), and diisopropoxyaluminum ethyl acetoacetate; and zirconium compounds such as zirconium tetrakis(acetylacetonate). A carboxylic acid and/or a metal carboxylate may be used as the curing catalyst. An amidine compound as described in WO 2008/078654 A is also usable. Examples of the amidine compound include 1-(o-tolyl)biguanide, 1-phenylguanidine, 1,2-dimethyl-1,4,5,6-tetrahydropyrimidine, 1,5,7-triazabicyclo[4.4.0]deca-5-ene, and 7-methyl-1,5,7-triazabicyclo[4.4.0]deca-5-ene. However, the compound is not limited thereto.

The use amount of the curing catalyst is from 0.1 to 10 parts by weight, preferably from 0.2 to 8 parts by weight, even more preferably from 0.3 to 2 parts by weight for 100 parts by weight of the total of the components (A) and (B). If the amount is less than 0.1 parts by weight, the catalyst does not exhibit an appropriate curing performance. If the amount is more than 10 parts by weight, the curing composition is too rapidly cured so that an appropriate cured product cannot be formed. Thus, the product cannot sufficiently exhibit a desired performance.

In the present invention, a plasticizer may be used. Examples of the plasticizer include non-aromatic bibasic acid esters such as dioctyl adipate, dioctyl sebacate, dibutyl sebacate, diisodecyl succinate; aliphatic esters such as butyl oleate, and methyl acetylricinolate; phosphates such as tricresyl phosphate, and tributyl phosphate; trimellitic acid esters; chlorinated paraffins; hydrocarbon oils such as alkyldiphenyl, and partially hydrogenated terphenyl; process oils; and epoxy plasticizers such as epoxidized soybean oil, and benzyl epoxystearate.

A phthalic acid ester may be used, examples thereof including dimethyl phthalate, diethyl phthalate, dibutyl phthalate, diisobutyl phthalate, di-n-hexyl phthalate, bis(2-ethylhexyl)phthalate, di-n-octyl phthalate, diisononyl phthalate, dinonyl phthalate, diisodecyl phthalate, diisoundecyl phthalate, and bisbutylbenzyl phthalate. However, the use amount thereof is preferably as small as possible, considering an effect thereof onto human bodies and the environment. It is desired not to use any phthalic acid ester. Cyclohexane dicarboxylate, which is obtained by hydrogenating these phthalic acid esters, may be used without worrying about safety. This plasticizer is sold as a trade name "Hexamoll DINCH" manufactured by BASF Corp. to be easily available.

A plasticizer having a relatively low molecular weight, as described above, may stain a surrounding base material or member to which the curable composition is applied; thus, the use amount thereof is desirably as small as possible. In particular, a porous stone material tends to be easily stained. The plasticizer easily exudes from, for example, granite, marble, or a siding board to damage a beautiful appearance thereof possibly. In order to restrain such a beautiful appearance damage, the use amount of the low-molecular-weight plasticizer such as a phthalic acid ester is preferably 200 parts by weight or less, preferably 100 parts by weight or less, preferably 50 parts by weight or less for 100 parts by weight of the total of the components (A) and (B). In order to obtain a curable composition having no staining property, it is most preferred that the curable composition does not substantially or at all contain any low-molecular-weight plasticizer.

When a paint is applied onto the curable composition, it is preferred to use a phthalic acid ester type plasticizer together as far as the staining property is not declined. This is because the use thereof makes an improvement in the adhesive property of the paint coat to overcome a problem that the coat is peeled. Specifically, the use amount thereof is preferably from 1 to 20 parts by weight, more preferably from 2 to 15 parts by weight, most preferably from 3 to 10 parts by weight for 100 parts by weight of the total of the components (A) and (B).

In the present curable composition, a high-molecular-weight plasticizer is usable. By the use of the high-molecular-weight plasticizer, the initial physical properties may be maintained over a longer term than that of any low-molecular-weight plasticizer having in the molecule thereof no polymeric component. Furthermore, the use can make an improvement in the drying property (referred to also as paintability) of an alkyd paint when the paint is applied to the cured product. Specific examples of the high-molecular-weight plasticizer include vinyl polymers each obtained by polymerizing a vinyl monomer in various ways; esters of any polyalkylene glycol, such as diethylene glycol dibenzoate, triethylene glycol dibenzoate, and pentaerythritol esters; polyester plasticizers each obtained from a bibasic acid such as sebacic acid, adipic acid, azelaic acid or phthalic acid, and a bihydric alcohol such as ethylene glycol, diethylene glycol, triethylene glycol, propylene glycol or dipropylene glycol; polyether polyols such as polyethylene glycol, polypropylene glycol and polytetramethylene glycol each having a molecular weight of 500 or more, particularly, 1,000 or more, derivatives each obtained by converting hydroxyl groups of such a polyether polyol into, for example, ester groups or ether groups, and other polyethers; polystyrene compounds such as polystyrene, and poly-α-methylstyrene; and polybutadiene, polybutene, polyisobutylene, butadiene/acrylonitrile, and polychloroprene. However, the plasticizer is not limited thereto.

Among these high-molecular-weight plasticizers, plasticizers compatible with the components (A) and (B) are preferred. From this viewpoint, polyethers or vinyl polymers are preferred. It is preferred to use a polyether as the plasticizer since the use improves the curable composition in surface curability and depth curability and does not cause a curing delay of the composition after stored. Among these polymers, polypropylene glycol is more preferred. Vinyl polymers are preferred from the viewpoint of the compatibility, weather resistance and heat resistance. Among the vinyl polymers, preferred are acrylic polymers and/or methacrylic polymers. More preferred are acrylic polymers such as polyalkyl acrylates. The method for synthesizing these polymers is preferably a living radical polymerization method, more preferably an atom transfer radical polymerization method since these methods make it possible to synthesize polymers that can have a narrow molecular weight distribution and be made low in viscosity. It is preferred to use a polymer described in JP-A-2001-207157, which is obtained through the so-called SGO process, i.e., a polymer obtained by subjecting an alkyl acrylate monomer to continuous bulk polymerization at high temperature and high pressure. This plasticizer is sold as a trade name "ARUFON" from Toagosei Co., Ltd.

The number-average molecular weight of the high-molecular-weight plasticizer is preferably from 500 to 15,000, more preferably from 800 to 10,000, even more preferably from 1,000 to 8,000, in particular preferably from 1,000 to 5,000, most preferably from 1,000 to 3,000. If the molecular weight is too low, the plasticizer is caused to flow out with time by rainfall, and as a result, the curable composition cannot maintain its initial physical properties over a long term, and cannot be improved in alkyd paintability. If the molecular weight is too high, the composition becomes high in viscosity to be deteriorated in workability. The molecular weight distribution of the high-molecular-weight plasticizer is not particularly limited, and is preferably narrow. The distribution is preferably less than 1.80, more preferably 1.70 or less, even more preferably 1.60 or less, even more preferably 1.50 or less, in particular preferably 1.40 or less, most preferably 1.30 or less.

The number-average molecular weight is measured by the GPC method about vinyl polymers, and measured by the terminal group analysis method about polyether polymers. The molecular weight distribution (Mw/Mn) is measured by the GPC method (in terms of that of polystyrene).

The plasticizers described hereinbefore may be used alone or in combination of two or more thereof. The low-molecular-weight plasticizer and the high-molecular-weight plasticizer may be used together. These plasticizers may each be blended (into the reaction system) when a polymer is produced.

The use amount of the high-molecular-weight plasticizer is from 5 to 150 parts by weight, preferably from 10 to 120 parts by weight, even more preferably from 20 to 100 parts by weight for 100 parts by weight of the total of the components (A) and (B). If the amount is less than 5 parts by weight, advantageous effects of the plasticizer are not produced. If the amount is more than 150 parts by weight, the cured product is to be insufficient in mechanical strength.

Thermally expandable hollow fine particles are usable which are described in JP-A-2004-51701, JP-A-2004-66749 and others. The thermally expandable hollow fine particles are plastic spheres in which a low-boiling-point compound such as a hydrocarbon having 1 to 5 carbon atoms is wrapped up with a polymeric outer-shell material (vinylidene chloride copolymer, acrylonitrile copolymer, or vinylidene chloride/acrylonitrile copolymer) into a spherical form. By heating a bonded region in which the present composition is applied, the inside of the shell of the thermally expandable hollow fine particles is increased in gas pressure so that the polymeric outer-shell material is softened. As a result, the volume thereof is drastically expanded so that the particles fulfill a function of peeling the bonded interfaces from each other. The addition of the thermally expandable hollow fine particles makes it possible to give an adhesive composition that can easily attain the peeling without breaking the adherend material only by heating the composition when unnecessary, and that can thermally attain the peeling without using any organic solvent.

An aminosilane may be added to the curable composition of the present invention. The aminosilane is a compound having in the molecule thereof a reactive silicon group and an amino group, and is usually called a tackifier. The use of this aminosilane attains the following: when the curable composition is applied to an adherend that may be of various types, that is, an inorganic base material such as glass, aluminum, stainless steel, zinc, copper or mortar, or an organic base material such as vinyl chloride, polyacrylic resin, polyester, polyethylene, polypropylene or polycarbonate, the composition exhibits a remarkable adhesive-property-improving effect under non-primer conditions or primer-treated conditions. The use under non-primer conditions produces a particularly remarkable effect of improving the adhesive property onto various adherends. The aminosilane is a compound which can also function as, for example, a physical property adjustor, or an inorganic-filler-dispersibility improver.

Specific examples of the reactive silicon group of the aminosilane may be the same groups as already demonstrated. Methoxy and ethoxy groups are preferred from the viewpoint of the hydrolysis rate (of the aminosilane). The number of the hydrolysable group is preferably 2 or more, in particular preferably 3 or more. Specific examples of the aminosilane include amino-group-containing silanes such as γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-(2-aminoethyl)aminoethyl)aminopropyltrimethoxysilane, γ-(6-aminohexyl)aminopropyltrimethoxysilane, 3-(N-ethylamino)-2- methylpropyltrimethoxysilane, γ-ureidopropyltrimethoxysilane, γ-ureiodpropyltriethoxysilane, N-phenyl-γ-aminopropyltrimethoxysilane, N-benzyl-γ-aminopropyltrimethoxysilane, N-vinylbenzyl-γ-aminopropyltriethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, N,N'-bis[3-(trimethoxysilyl)propyl]ethylenediamine; and ketimine type silanes such as N-(1,3-dimethyl butylidene)-3-(triethoxysilyl)-1-propaneamine.

Among these examples, preferred are γ-aminopropyltrimethoxysilane, γ-(2-aminoethyl)aminopropyltrimethoxysilane and γ-(2-aminoethyl)aminopropylmethyldimethoxysilane to ensure a sufficient adhesive property. About the aminosilane, a single species thereof may be used alone or two or more species thereof may be used together. It is pointed that γ-(2-aminoethyl)aminopropyltrimethoxysilane has a larger irritative property than other aminosilanes. The irritative property can be relieved not by a decrease in the amount of this irritative aminosilane but by the use of γ-aminopropyltrimethoxysilane together therewith.

The blend amount of the aminosilane is preferably from about 1 to 10 parts by weight, more preferably from 2 to 5 parts by weight for 100 parts by weight of the total of the components (A) and (B). If the blend amount of the aminosilane is less than 1 part by weight, the composition may not gain a sufficient adhesive property. If the blend amount is more than 10 parts by weight, the cured product may be brittle not to gain a sufficient strength, and further the curable composition may be small in curing rate.

In the composition of the present invention, a tackifier other than the aminosilane may be used.

Specific examples of the tackifier other than the aminosilane include epoxy-group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, and β-(3,4-epoxycyclohexyl)ethyltriethoxysilane; isocyanate-group-containing silanes such as γ-isocyanatopropyltrimethoxysilane, γ-isocyanatopropyltriethoxysilane, γ-isocyanatopropylmethyldiethoxysilane, γ-isocyanatopropylmethyldimethoxysialne, (isocyanatomethyl)trimethoxysilane, and (isocyanatomethyl)dimethoxymethylsilane; mercapto-group-containing silanes such as γ-mercaptopropyltrimethoxysilane, γ-mercaptopropyltriethoxysilane, γ-mercaptopropylmethyldimethoxysilane, γ-mercaptopropylmethyldiethoxysilane, and γ-mercapomethyltriethoxysilane; carboxyl-group-containing silanes such as β-carboxyethyltriethoxysilane, β-carboxyethylphenylbis(2-methoxyethoxy)silane, and N-β-(carboxymethyl)aminoethyl-γ-aminopropyltrimethoxysilane; vinyl-unsaturated-group-containing silanes such as vinyltrimethoxysilane, vinyltriethoxysilane, γ-methacryloyloxypropylmethyldimethoxysilane, and γ-acryloyloxypropylmethyltriethoxysilane; halogen-containing silanes such as γ-chloropropyltrimethoxysilane; and isocyanurate silanes such as tris(trimethoxysilyl) isocyanurate. A condensate obtained by partially condensing any one of these silanes may be used. A derivative obtained by modifying any one of these may be used as the silane coupling agent, examples thereof including amino-modified silyl polymers, silanized amino polymers, unsaturated aminosilane complexes, phenylamino long-chain-alkyl silanes, aminosilanized silicones, and silanized polyesters. The silane coupling agent used in the present invention is used in an amount of 0.1 to 10 parts by weight for 100 parts by weight of the total of the components (A) and (B). The agent is used in particular preferably in an amount of 0.5 to 5 parts by weight therefor.

The advantageous effect of the silane coupling agent added to the curable composition of the present invention is an effect of improving the composition remarkably in adhesive property to various adherends when the composition is used for the adherends, examples thereof including inorganic base materials such as glass, aluminum, stainless steel, zinc, copper, mortal, and organic base materials such as vinyl chloride, acrylic resin, polyester, polyethylene, polypropylene, and polycarbonate under non-primer conditions or primer-treated conditions. The use under non-primer conditions produces a particularly remarkable effect of improving the adhesive property onto various adherends. Specific examples of the tackifier other than the silane coupling agent include, but are not particularly limited to, epoxy resin, phenolic resin, sulfur, alkyl titanates, and aromatic polyisocyanates. These tackifiers may be used alone or in the form of a mixture of two or more thereof. The addition of these tackifiers makes it possible to improve the composition in adhesive property onto an adherend.

Among these tackifiers, preferred are γ-glycidoxypropyltrimethoxysilane, γ-glycidoxypropyltriethoxysilane, and γ-glycidoxypropylmethyldimethoxysilane for the composition to ensure a good adhesive property.

The use amount of the tackifier is preferably from about 0.01 to about 10 parts by weight, more preferably from about 0.1 to about 5 parts by weight, in particular preferably from about 1 to about 3 parts by weight for 100 parts by weight of the total of the components (A) and (B). If the blend amount of the tackifier is below this range, the composition may not gain a sufficient adhesive property. If the blend amount of the tackifier is above this range, the composition may not gain a practical depth-curability.

The usable tackifier is not particularly limited and, for example, the following may be used as the tackifier besides the above-mentioned tackifiers: epoxy resin, phenolic resin, sulfur, alkyl titanates, and aromatic polyisocyanates. These tackifiers may be used alone or in the form of a mixture of two or more thereof. However, epoxy resin may deteriorate the composition in catalytic activity in accordance with the addition amount thereof. Thus, it is preferred that the addition amount of epoxy resin to the curable composition of the present invention is small. The use amount of epoxy resin is preferably 5 parts by weight or less, more preferably 0.5 parts by weight or less for 100 parts by weight of the total of the components (A) and (B). It is particularly preferred that the composition does not substantially contain epoxy resin.

In the curable composition obtained in the present invention, an antioxidant (anti-aging agent) is usable. The use of the antioxidant can make the cured product high in heat resistance. Examples of the antioxidant include hindered phenol type, monophenol type, bisphenol type and polyphenol type antioxidants. Particularly preferred are hindered phenol type antioxidants. Equivalently, hindered amine type light stabilizers may be used, examples thereof including those identified by TINUVIN 622LD, TINUVIN 144, CHIMASSORB 944LD, and CHIMASSORB 119FL (each manufactured by BASF Japan Ltd.); MARK LA-57, MARK LA-62, MARK LA-67, MARK LA-63, and MARK LA-68 (each manufactured by Adeka Corp.); and SANOL LS-770, SANOL LS-765, SANOL LS-292, SANOL LS-2626, SANOL LS-1114, and SANOL LS-744 (each manufactured by Sankyo Lifeteck Co., Ltd.). Specific examples of the antioxidant are also described in JP-A-4-283259, and JP-A-9-194731. The use amount of the antioxidant is advisably from 0.1 to 5 parts by weight, more preferably from 0.2 to 3 parts by weight for 100 parts by weight of the total of the components (A) and (B).

In the composition obtained in the present invention, a light stabilizer is usable. The use of the light stabilizer makes it possible to prevent the cured product from being optically oxidized and deteriorated. Examples of the light stabilizer include benzotriazol type, hindered amine type, and benzoate type compounds. Particularly preferred are hindered amine type compounds. The use amount of the light stabilizer is preferably from 0.1 to 5 parts by weight, more preferably from 0.2 to 3 parts by weight for 100 parts by weight of the total of the components (A) and (B). Specific examples of the light stabilizer are also described in JP-A-9-194731.

In the case of using, in the composition obtained in the present invention, a light curable substance, particularly, an unsaturated acrylic compound together, it is preferred to use a tertiary-amine-containing hindered amine type light stabilizer as a hindered amine light stabilizer in order to improve the composition in storage stability, as described in JP-A-5-70531. Examples of the tert-hindered amine type light stabilizer include those identified as TINUVIN 622LD, TINUVIN 144, and CHIMASSORB 119FL (each manufactured by BASF Japan Ltd.); MARK LA-57, MARK LA-62, MARK LA-67, and MARK LA-63 (each manufactured by Adeka Corp.); and SANOL LS-765, SANOL LS-292, SANOL LS-2626, SANOL LS-1114, and SANOL LS-744 (each manufactured by BASF Japan Ltd.).

In the composition obtained in the present invention, an ultraviolet absorbent is usable. The use of the ultraviolet absorbent can make the cured product high in surface weather resistance. Examples of the ultraviolet absorbent include benzophenone type, benzotriazole type, salicylate type, substituted tolyl type, and metal chelate type compounds. Particularly preferred are benzotriazole type compounds. The use amount of the ultraviolet absorbent is preferably from 0.1 to 5 parts by weight, more preferably from 0.2 to 3 parts by weight for 100 parts by weight of the total of the components (A) and (B). It is preferred to use a phenolic or hindered phenolic antioxidant, a hindered amine type light stabilizer, and a benzotriazole ultraviolet absorbent together.

A filler may be added to the composition of the present invention. Examples of the filler include reinforcing fillers such as fume silica, precipitating silica, crystalline silica, fused silica, dolomite, silicic anhydride, hydrated silicic acid, and carbon black; heavy calcium carbonate, colloidal calcium carbonate, magnesium carbonate, diatomaceous earth, fired clay, clay, talc, titanium oxide, bentonite, organic bentonite, ferric oxide, fine aluminum particles, flint powder, zinc oxide, activated zinc flower, volcanic sand balloons, glass microballoons, organic micro-balloons of phenolic resin or vinylidene chloride resin, PVC powder, PMMA powder, and other resin-powder(-like) fillers; and fibrous fillers such as a glass fiber and a filament. When the filler is used, the use amount thereof is from 1 to 150 parts by weight, preferably from 10 to 100 parts by weight for 100 parts by weight of the total of the components (A) and (B).

When a cured product high in strength is desired to be obtained by use of the filler, it is preferred that the filler is selected mainly from fume silica, precipitating silica, crystalline silica, fused silica, dolomite, silicic anhydride, hydrated silicic acid, carbon black, surface-treated fine calcium carbonate, fired clay, clay, activated zinc flower and others. A result preferred (for the desire) is obtained, by using the selected filler in an amount of 1 to 100 parts by weight for 100 parts by weight of the total of the components (A) and (B). When a cured product low in strength and large in elongation at break is desired to be obtained, a result preferred therefor is obtained by use of a filler selected mainly from titanium oxide, any calcium carbonate species such as heavy calcium carbonate, magnesium carbonate, talc, ferric oxide, zinc oxide, and volcanic sand balloons in an amount of 5 to 100 parts by weight for 100 parts by weight of the total of the components (A) and (B). About the calcium carbonate species, it is general that as the species is larger in specific surface area, the species produces a larger advantageous effect of improving the resultant cured product in breaking strength, elongation at break and adhesive property. Of course, these fillers may be used alone, or in the form of a mixture of two or more thereof. When the calcium carbonate species is/are used, it is desired to use surface-treated fine calcium carbonate together with a calcium carbonate species large in particle size, such as heavy calcium carbonate. The particle size of the surface-treated fine calcium carbonate is preferably 0.5 μm or less, and the surface treatment is preferably a treatment with an aliphatic acid or aliphatic acid salt. The calcium carbonate species large in particle size preferably has a particle size of 1 μm or more, and may be a species not subjected to any surface treatment.

In order to improve the composition in workability (such as anti-dripping property), and make the surface of the cured product mat, it is preferred to add organic balloons or inorganic balloons thereto. These fillers may be subjected to a surface treatment. A single species of the fillers may be used alone, or two or more species thereof may be used in a mixture form. To improve the composition in workability (such as anti-dripping property), the particle size of the balloons is preferably 0.1 mm or less. To make the surface of the cured product mat, the size is preferably from 5 to 300 μm.

Because of a good chemical resistance of any cured product of the composition of the present invention, and other advantages, the composition is used suitably for a joining material for external walls of houses, such as siding boards, particularly, ceramic siding boards; an adhesive for external wall tiles; an adhesive for external wall tiles which is to remain as it is in a joining material for these tiles; or others. The design of the sealing material is desirably matched with the design of the external walls. External walls giving a high-grade feeling have come to be used, these walls being obtained, in particular, by use of sputtering-painting, or the incorporation of a colored aggregate. When a scaly or granular substance having a diameter of 0.1 mm or more, preferably a diameter of about 0.1 to 5.0 mm is blended into the composition of the present invention, the resultant composition is an excellent composition giving a cured product the external appearance of which is maintained for a long term since the cured product is matchable with such high-grade-feeling external walls, and is excellent in chemical resistance. When the granular substance is used, the resultant cured product has a grained surface in a sand-scattered tone or sandstone tone. When the scaly substance is used, the resultant cured product has a surface having irregularities caused by the scaly form.

As described in JP-A-9-53063, a preferred diameter, blend amount and material of the scaly or granular substance, and other factors thereof are as follows:

The diameter of the substance is 0.1 mm or more, preferably from about 0.1 to about 5.0 mm. In accordance with the material, the pattern and others of the external walls, the substance having an appropriate size is used. A substance having a diameter of about 0.2 to about 5.0 mm, or about 0.5 to about 5.0 mm may be used. In the case of the scaly substance, the thickness thereof is set into the range of about 1/10 to 1/5 (about 0.01 to 1.00 mm) of the diameter. The scaly or granular substance is carried, in the form of a sealing material in which the substance is beforehand incorporated into a main sealing material, to a spot in which the sealing material is to be applied, or when used, the substance is incorporated into a main sealing material in the same spot.

The scaly or granular substance is blended into the composition, which is, for example, a sealing material composition or adhesive composition, in an amount of about 1 to about 200 parts by weight for 100 parts by weight of the composition. The blend amount is appropriately selected in accordance with the size of individual scales or grains of the scaly or granular substance, the material and the pattern of the external walls, or other factors.

The scaly or granular substance may be a natural substance such as silica sand or mica, a synthetic rubber, a synthetic resin, or an inorganic substance such as alumina. When the composition is filled into a joining region (between external walls), the substance is colored into an appropriate color in accordance with the material and the pattern of the external walls, and other factors in order to heighten the design performance of the region.

When balloons (preferably having an average particle size of 0.1 mm or more) are used for a similar purpose, the joining region can have a grained surface in a scattered-sand tone or a sandstone tone and further the region can be lightened. As described in JP-A-10-251618, a preferred diameter, blend amount and material of the balloons, and other factors thereof are as follows:

The balloons are a spherical filler having a hollow inside. Examples of the material of the balloons include inorganic materials such as glass, volcanic sand, and silica; and organic materials such as phenolic resin, urea resin, polystyrene and saran. However, the material is not limited only thereto. Thus, it is allowable to use a material obtained by compositing an inorganic material with an organic material; or form, in the balloons, plural layers by lamination. It is allowable to use inorganic or organic balloons, or balloons in which these are composited with each other. The balloons used may be the same balloons, or a mixture of plural balloons made of different materials. The balloons used may be balloons each having a worked surface or coated surface, or having a surface treated with a surface treatment agent that may be of various types. The balloons used may be, for example, organic balloons coated with, for example, calcium carbonate, talc or titanium oxide, or inorganic balloons surface-treated with a tackifier.

In order to gain a grained surface in a scattered-sand tone or sandstone tone, the particle size of the balloons is preferably 0.1 mm or more. The particle size of the particles may be from about 0.2 to about 5.0 mm, or from about 0.5 to about 5.0 mm. Even when a large amount of balloons having a particle size less than 0.1 mm is blended into the composition, only the viscosity of the composition is raised and the composition may not exhibit a grained feeling. The blend amount of the balloons can easily be decided in accordance with a target degree of the grained feeling in the scattered-sand tone or sandstone tone. Usually, it is desired that balloons having a particle size of 0.1 mm or more are blended into the composition to have a concentration by volume of 5 to 25% by volume of the composition. If the concentration by volume of the balloons is less than 5% by volume, no grained feeling is obtained. If the concentration is more than 25% by volume, the sealing material or adhesive is high in viscosity to be deteriorated in workability. The resultant cured product is also high in modulus. Thus, basic performances of the sealing material or adhesive tend to be damaged. The concentration by volume is in particular preferably from 8 to 22% by volume from the viewpoint of the balance with basic performances of the sealing material.

When the balloons are used, the following may be added (to the composition): a slip preventive as described in JP-A-2000-154368, and an amine compound as described in JP-A-2001-164237 for adding irregularities to the surface of the cured product to make the surface mat, particularly, a primary and/or secondary amine having a melting point of 35° C. or higher.

Specific examples of the balloons are described in, for example, JP-A-2-129262, JP-A-4-8788, JP-A-4-173867, JP-A-5-1225, JP-A-7-113073, JP-A-9-53063, JP-A-10-251618, JP-A-2000-154368 and JP-A-2001-164237, and WO 97/05201 A.

Also when the composition of the present invention contains sealing material cured particles, irregularities are formed in the surface of the resultant cured product so that the product can be improved in design performance. As described in JP-A-2001-115142, a preferred diameter, blend amount and material of the sealing material cured particles, and other factors thereof are as follows: The diameter is preferably from about 0.1 to about 1 mm, more preferably from about 0.2 to about 0.5 mm. The blend amount is preferably from 5 to 10% by weight of the curable composition, more preferably from 20 to 50% by weight thereof. The material is not limited as far as the material is a material usable for a sealing material, and is, for example, urethane resin, silicone, modified silicone, polysulfide rubber. The material is preferably a modified silicone type sealing material.

In the composition of the present invention, a silicate is usable. This silicate acts as a crosslinking agent, and has a function of improving the organic polymer of the present invention, which is the components (A) and (B), in elastic restorability, endurance, and creep resistance. The silicate also has an advantage of improving the composition in adhesive property, water-resistant adhesive property, and adhesion endurance under high temperature and high humidity. The silicate may be a tetraalkoxysilane or a partially hydrolyzed condensate thereof. When the silicate is used, the use amount thereof is from 0.1 to 10 parts by weight, preferably from 0.5 to 5 parts by weight for 100 parts by weight of the total of the components (A) and (B).

Specific examples of the silicate include tetraalkoxysilanes (tatraalkylsilicates) such as tetramethoxyisilane, tetraethoxysilane, ethoxytrimethoxysilane, dimethoxydiethoxysilane, methoxytriethoxysilane, tetra-n-propoxysilane, tetra-1-propoxysilane, tetra-n-butoxysilane, tetra-1-butoxysilane, and tetra-t-butoxysilane; and partially hydrolyzed condensates thereof.

A partially hydrolyzed condensate of any tetraalkoxysilane is preferred since the condensate produces larger advantages of improving the composition of the present invention in elastic restorability, endurance, and creep resistance than the tetraalkoxysilane.

The partially hydrolyzed condensate of a tetraalkoxysilane is, for example, a product obtained by adding water to, and partially hydrolyzing the tetraalkoxysilane to be condensed in a usual way. As a partially hydrolyzed condensate of an organosilicate compound, commercially available one is usable. Examples of such a condensate include products METHYL SILICATE 51, and ETHYL SILICATE 40 (each manufactured by Colcoat Co., Ltd.).

To the curable composition of the present invention may be added a physical property adjustor for adjusting tensile properties of a cured product to be produced therefrom if necessary. The physical property adjustor is not particularly limited, and examples thereof include alkylalkoxysilanes such as methyltrimethoxysilane, dimethyldimethoxysilane, trimethylmethoxysilane, and n-propyltrimethoxysilane; alkylisopropenoxysilanes such as dimethyldiisopropenoxysilane, methyltriisopropenoxysilane, and γ-glycidoxypropylmethyldiisopropenoxysilane; alkoxysilanes each having a functional group such as γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane, and γ-mercaptopropylmethyldimethoxysilane; silicone vanishes; and polysiloxanes. The use of the physical property adjustor makes it possible to raise the hardness of a product obtained when the composition of the present invention is cured, or reversely lower the hardness to cause the product to exhibit an elongation at break. The above-mentioned physical property adjustors may be used alone or in combination of two or more thereof.

A compound which is hydrolyzed to produce a compound having, in the molecule thereof, a monovalent silanol group has, particularly, an effect of lowering the cured product in modulus without causing any deterioration about the tackiness of the surface of the cured product. The compound is in particular preferably a compound which is to produce trimethylsilanol. Examples of the compound, which is hydrolyzed to produce a compound having, in the molecule thereof, a monovalent silanol group, include those described in JP-A-5-117521. Other examples thereof include a compound capable of producing a silicon compound which is hydrolyzed to produce $R^3SiOH$ such as trimethylsilanol and which is a derivative of an alkyl alcohol such as hexanol, octanol or decanol; and a compound capable of producing a silicon compound which is hydrolyzed to produce $R^3SiOH$ such as trimethylsilanol and which is a derivative of a polyhydric alcohol having 3 or more hydroxyl groups, such as trimethylolpropane, glycerin, pentaerythritol or sorbitol, as described in JP-A-11-241029.

Other examples thereof include a compound capable of producing a silicon compound which is hydrolyzed to produce $R^3SiOH$ such as trimethylsilanol and which is a derivative of an oxypropylene polymer, as described in JP-A-7-258534. In addition, a polymer having a crosslinkable reactive silicon-containing group, and a silicon-containing group capable of being hydrolyzed to be a monosilanol-containing compound, as described in JP-6-279693, may be used.

The physical property adjustor is used in an amount of 0.1 to 10 parts by weight, preferably from 0.5 to 5 parts by weight for 100 parts by weight of the total of the components (A) and (B). To the curable composition of the present invention may be added as needed a thixotropy supplier (dripping preventive) to prevent the composition from dripping to improve the composition in workability. The dripping preventive is not particularly limited, and examples thereof include polyamide waxes; hydrogenated castor oil derivatives; and metal soaps such as calcium stearate, aluminum stearate, and barium stearate. In the case of using a rubber powder having a particle diameter of 10 to 500 μm as described in JP-A-11-349916 or an organic fiber as described in JP-A-2003-155389, a composition high in thixotropy to be good in workability may be obtained. These thixotropy suppliers (dripping preventives) may be used alone, or in combination of two or more thereof. The thixotropy supplier (s) is/are used in an amount of 0.1 to 10 parts by weight for 100 parts by weight of the total of the components (A) and (B).

In the composition of the present invention, a compound having in a single molecule thereof an epoxy group is usable. The use of the epoxy-group-having compound makes it possible to heighten the elastic restorability of the cured product. Examples of the epoxy-group-having compound include epoxidized unsaturated oils and fats, epoxidized unsaturated fatty acid esters, alicyclic epoxy compounds, and epichlorohydrin derivatives; and mixtures of these compounds. Specific examples thereof include epoxidized soybean oil, epoxidized linseed oil, bis(2-ethylhexyl)-4,5-epoxycyclohexane-1,2-dicarboxylate (E-PS), epoxyoctyl stearate, and epoxybutyl stearate. Among these, E-PS is particularly preferred. The epoxy compound is used advisably in an amount of 0.5 to 30 parts by weight for 100 parts by weight of the total of the components (A) and (B).

In the composition of the present invention, a photocurable substance is usable. The use of the photocurable substance makes it possible to form a coat of the photocurable substance on the surface of the cured product to improve the tackiness or the weather resistance of the cured product. The photocurable substance is a substance having a molecular structure that is chemically changed in a considerably short period by effect of light so as to undergo a physical property change such as curing. As a compound of this type, known are many compounds such as organic monomers, oligomers, resins, or compositions containing these compounds, respectively. Any commercially available photocurable substance is usable. Typically, an unsaturated acrylic compound, a poly(vinyl cinnamate) compound, and an azidated resin and the like may be used. Examples of the unsaturated acrylic compound include monomers or oligomers which each have one to several acrylic or methacrylic unsaturated group (s) and which are each a monomer such as propylene (or butylene or ethylene) glycol di(meth)acrylate or neopentyl glycol di(meth)acrylate, or an oligoester made from such a monomer and having a molecular weight of 10,000 or less; or mixtures thereof. Specific examples thereof include especial (bifunctional)acrylates ARONIX M-210, ARONIX M-215, ARONIX M-220, ARONIX M-233, ARONIX M-240, and ARONIX M-245; (trifunctional)acrylates ARONIX M-305, ARONIX M-309, ARONIX M-310, ARONIX M-315, ARONIX M-320, and ARONIX M-325; and a (polyfunctional)acrylate ARONIX M-400. The unsaturated acrylic compound is in particular preferably a compound having an acrylic functional group, or a compound having in a single molecule thereof three or more acrylic functional groups on average. (ARONIX described above are products manufactured by Toagosei Co., Ltd.). Examples of the poly(vinyl cinnamate) compound include a photosensitive resin which has a cinnamoyl group as a photosensitive group and is obtained by esterifying a polyvinyl alcohol with cinnamic acid; and many poly(vinyl cinnamate) derivatives. The azidated resin is known as a photosensitive resin having an azide group as a photosensitive group. The resin is usually a rubbery photosensitive liquid to which a diazide compound is added as a photosensitizer. Detailed examples thereof are described in "Photosensitive Resin" (published on Mar. 17, 1972 by Insatsu Gakkai Shuppanbu Ltd., p. 93 and thereinafter, p. 106 and thereinafter, and p. 117 and thereinafter). These may be used alone or in the form of a mixture thereof in the state that a sensitizer is added thereto if necessary. When a sensitizer such as a ketone or nitro compound, or a promoter such as an amine is added thereto, the advantageous effect may be improved. The photocurable substance is used in an amount of 0.1 to 10 parts by weight, preferably from 0.5 to 5 parts by weight for 100 parts by weight of the total of the components (A) and (B). If the amount is 0.1 parts by weight or less, the substance does not produce the effect of heightening the weather resistance. If the amount is 10 parts by weight or more, the cured product becomes too hard so that the product tends to be cracked.

In the composition of the present invention, an oxygen curable substance is usable. The oxygen curable substance is, for example, an unsaturated compound which may be reactive with oxygen in the air, and reacts with the oxygen in the air to form a cured coat in the vicinity of the surface of the cured product to prevent the tackiness of the surface or adhesion of wastes or dust on the cured product surface, or attain other effects. Specific examples of the oxygen curable substance include dry oils, and various alkyd resins obtained by modifying the compounds, respectively, typical examples of the oils including tung oil and linseed oil; acrylic polymers each modified by a dry oil, epoxy resins, and silicon resins; liquid polymers, such as 1,2-polybutadiene, 1,4-polybutadiene and C5 to C8 diene polymers, which are each obtained by polymerizing or copolymerizing a diene compound such as butadiene, chloroprene, isoprene or 1,3-pentadiene; NBR, SBR and other liquid copolymers, which are each obtained by copolymerizing such a diene compound with a copolymerizable monomer, such as acrylonitrile or styrene, in such a manner that this diene compound will constitute main moieties of the copolymer; and various modified products (such as maleic-modified products, and boiled-oil-modified products) of these liquid polymers. These may be used alone or in combination of two or more thereof. Among these examples, tung oil and liquid diene polymers are particularly preferred. When a catalyst for promoting the oxygen curing reaction, or a metal drier is used together, the advantageous effect may be enhanced. Examples of the catalyst or the metal drier include metal salts such as cobalt naphthenate, lead naphthenate, zirconium naphthenate, cobalt octylate and zirconium octylate; and amine compounds. The use amount of the oxygen curable substance is used preferably in an amount of 0.1 to 10 parts by weight, more preferably 0.5 to 5 parts by weight for 100 parts by weight of the total of the components (A) and (B). If the use amount is less than 0.1 parts by weight, the staining property is not sufficiently overcome. If the amount is more than 10 parts by weight, tensile properties and others of the cured product tend to be damaged. As described in JP-A-3-160053, it is preferred to use the oxygen curable substance together with the photocurable substance.

To the curable composition of the present invention may be added a frame retardant, such as a phosphorous-containing plasticizer such as ammonium polyphosphate or tricresyl phosphate, aluminum hydroxide, magnesium hydroxide or thermal expandable graphite. The flame retardant may be used alone or in combination of two or more thereof.

The frame retardant is used in an amount of 5 to 100 parts by weight, preferably 10 to 50 parts by weight for 100 parts by weight of the total of the components (A) and (B).

In the composition of the present invention, a solvent may be used in order to decrease the composition in viscosity and heighten it in thixotropy to be improved in workability. The solvent is not particularly limited, and may be a compound that may be of various types. Specific examples thereof include hydrocarbon solvents such as toluene, xylene, heptane, hexane, and petroleum based solvents; halogen-containing solvents such as trichloroethylene; ester solvents such as ethyl acetate, and butyl acetate; ketone solvents such as acetone, methyl ethyl ketone, and methyl isobutyl ketone; alcohol solvents such as methanol, ethanol, and isopropyl alcohol; and silicone solvents such as hexamethylcyclotrisiloxane, octamethylcyclotetrasiloxane, and decamethylcyclopentasiloxane. These solvents may be used alone or in combination of two or more thereof.

However, if the blend amount of the solvent is large, the composition may be high in toxicity to human bodies and further the cured product may undergo volume shrinkage or some other inconvenience. Accordingly, the blend amount of the solvent is preferably 3 parts by weight or less, more preferably 1 part by weight or less for 100 parts by weight of the total of the components (A) and (B). Most preferably, the composition does not substantially containing any solvent.

To the curable composition of the present invention may be added various additives as needed in order to adjust various properties of the curable composition or the cured product. Examples of the additives include a curability adjustor, a radical inhibitor, a metal inactivating agent, an antiozonant, a phosphorous-containing peroxide decomposer, a lubricant, a pigment, a foaming agent, a repellent for ants, and an antifungal agent. The various additives may be used alone or in combination of two or more thereof. Specific of the additives other than the specific additive examples described in the present specification are described in JP-B-4-69659, JP-B-7-108928, JP-A-63-254149, JP-A-64-22904, and JP-A-2001-72854.

The curable composition of the present invention may be prepared into a one-pack type product curable with moisture in the air after the application thereof by blending all the blend components with each other, and sealing and storing the blend in advance. The curable composition may be prepared into a two-pack type product, in which a curing catalyst, a filler, a plasticizer, water and others are beforehand blended with each other separately into a curing agent, and this blend is to be mixed with the polymer composition before the product is used. The one-pack type product is preferred from the viewpoint of workability.

When the curable composition is the one-pack type product, all the blend components are beforehand blended with each other. Thus, it is preferred to dehydrate and dry a water-containing component, out of the blend components, beforehand, and then use the component, or dehydrate the blend components by, for example, pressure-reduction while the components are blended and kneaded. When the curable composition is the two-pack type polymer composition, it is unnecessary to blend a curing catalyst with its main blend agent containing the reactive-silicon-group-having polymer. Thus, even when the blend agent contains water slightly, it is not feared that the blend agent is gelatinized. When the main blend agent needs to have storage stability over a long term, it is preferred to dehydrate and dry the main blend agent. The method for the dehydration and drying is suitably a drying method by heating, or a dehydrating method by pressure-reduction when the main blend agent is in the form of a solid such as powder. The method is suitably a dehydrating method by pressure-reduction, or a dehydrating method using, for example, synthetic zeolite, activated alumina, silica gel, caustic lime or magnesium oxide when the main blend agent is liquid. In addition to such a drying method by dehydration, the following manner may be adopted: a manner of adding (to the main blend agent) an alkoxysilane compound such as n-propyltrimethoxysilane, vinyltrimethoxysilane, vinylmethyldimethoxysilane, methyl silicate, ethyl silicate, γ-mercaptopropylmethyldimethoxysilane, γ-mercaptopropylmethyldiethoxysilane, or γ-glycidoxypropyltrimethoxysilane to be caused to react with water, thereby attaining dehydration; a manner of blending therewith an oxazolidine compound such as 3-ethyl-2-methyl-2-(3-methylbutyl)-1,3-oxazolidine to be caused to react with water, thereby attaining dehydration; or a manner of blending therewith an isocyanate compound in a small quantity to cause its isocyanate group to react with water, thereby attaining dehydration. The addition of the alkoxysilane compound, the oxazolidine compound or the isocyanate compound makes an improvement of the composition in storage stability.

Preferably, the use amount of the dehydrating agent, particularly, a silicon compound reactive with water, such as vinyltrimethoxysilane, is from 0.1 to 10 parts by weight, preferably from 0.5 to 5 parts by weight for 100 parts by weight of the component (A).

The method for preparing the curable composition of the present invention is not particularly limited, and an ordinary method may be adopted, for example, a method of blending the above-mentioned components with each other, and using, for example, a mixer, rolls or a kneader to knead the blend at normal temperature or under a heating condition; or using a small amount of an appropriate solvent to dissolve the components therein, thereby mixing the components with each other.

When exposed to the atmosphere, the curable composition of the present invention is formed into a three-dimensional network structure by effect of water so as to be cured into a solid having rubbery elasticity.

The curable composition of the present invention is usable as a pressure-sensitive adhesive, a sealing material for a structure, a ship, an automobile, a road and others, an adhesive, a mold-forming material, a vibration proof material, a vibration deadening material, a soundproof material, a foaming material, a paint, a spraying material, and others. Since a cured product obtained by curing the curable composition of the present invention is excellent in flexibility and adhesive property, the curable composition is more preferably used as a sealing material or an adhesive among these articles.

The curable composition is also usable as various articles, for example, an electrical or electronic member material such as a solar battery rear-surface sealing material, an electrical insulating material such as an insulating coating material for an electrical wire or cable, an elastic adhesive, a contact-type adhesive, a spraying type sealing material, a crack repairing material, an adhesive for tiling, a powder coating, a casting material, a rubbery material for medicine, a pressure-sensitive adhesive for medicine, a sealing material for medical machinery, a food packaging material, a sealing material for joining exterior members such as siding boards with each other, a coating material, a primer, an electroconductive material for shielding electromagnetic waves, a thermoconductive material, a hot melt material, a potting agent for an electrical or electronic member, a film, a gasket, various shaping-materials, a rust inhibitive or waterproof material for an end face (cut face) of a piece of wire glass or laminated glass, and a liquid sealing agent used in automobile parts, electrical members, and various mechanical members. Since the curable composition can adhere, alone or by aid of a primer, closely to various base materials or members such as glass, porcelain, wood, metal, or a resin-shaped product, the composition is further usable as a sealing composition or an adhesive composition that may be of various types. Moreover, the curable composition of the present invention is also usable as an adhesive for interior panels, an adhesive for exterior panels, an adhesive for tiling, an adhesive for laying a stone material, an adhesive for ceiling-finish, an adhesive for floor-finish, an adhesive for wall-finish, an adhesive for vehicle panels, an adhesive for fabricating an electrical, electronic or precision instrument, a sealing material for direct glazing, a sealing material for laminated glass, a sealing material for an SSG construction method, or a sealing for a working joint of a building.

A cured product obtained from the curable composition of the present invention is excellent in paint anti-staining property. Thus, the present invention can give a cured product having a silica sand adhesion amount of 10 mg/cm$^2$ or less, or a better cured product having a silica sand adhesion amount less than 2 mg/cm$^2$. The method for evaluating the paint anti-staining property (of any curable composition) was a method of allowing the curable composition to stand under the condition of 23° C. and 50% RH for 3 days, and then curing the composition at 50° C. over 4 days; applying, onto a front surface of the resultant sheet, an aqueous acrylic emulsion paint (trade name: "PLEASE COAT", manufactured by SK Kaken Co., Ltd.), and further allowing the paint-applied sheet to stand still at 23° C. and 50% RH for 7 days; then applying a silica sand, 67 BLACK, manufactured by Shintoh Tohryou Co., Ltd., evenly onto the surface of the sample; and measuring, after 3 hours from the application, the adhesion amount of the silica sand obtained when the silica sand was lightly brushed away with a brush.

EXAMPLES

The following will specifically describe the present invention byway of working examples and comparative examples. However, the present invention is not limited thereto.

Synthesis Example 1

Propylene oxide was polymerized, using, as an initiator, a polyoxypropylene glycol monobutyl ether having a molecular weight of about 1,200 (trade name: NEW POLE LB-285, manufactured by Sanyo Chemical Industries, Ltd.) in the presence of a zinc hexacyanocobaltate glyme complex catalyst to yield a polypropylene oxide having a number-average molecular weight of about 7,500 (molecular weight in term of that of polystyrene which was obtained by measuring using a system HLC-8120 GPC manufactured by Tosoh Corp. as a liquid-feeding system, a column, TSK-GEL H type, manufactured by Tosoh Corp., and THF as a solvent. Subsequently, to the polypropylene oxide having hydroxyl groups was added a solution of NaOMe in methanol, the quantity of NaOMe being an equivalent 1.2 times the quantity of the hydroxyl groups. Methanol was then distilled off, and further thereto was added 3-chloro-2-methyl-1-propene to convert the respective hydroxyl groups at the terminals to methallyl groups.

Into 100 parts by weight of the obtained crude polypropylene oxide having, only at the respective single terminals of the molecules thereof, the methallyl groups were blended 300 parts by weight of n-hexane and 300 parts by weight of water, and then the blend was stirred. The water was then removed by centrifugation. Into the resultant hexane solution were further blended 300 parts by weight of water. The blend was stirred and then again subjected to centrifugation to remove the water. Thereafter, hexane was removed by devolatizing under reduced pressure. This process gave a polypropylene oxide having a number-average molecular weight of about 7,500 in terms of that of polystyrene according to GPC and having, at respective single terminals of molecules thereof, methallyl groups.

In the presence of 150 ppm of a solution of a platinum vinylsiloxane complex in isopropanol, as a catalyst, the content by percentage of platinum therein being 3% by weight, 2.3 parts by weight of methyldimethoxysilane were caused to react with 100 parts by weight of the resultant polypropylene oxide having, only at the respective single terminals, methallyl groups at 90° C. for 5 hours to yield a polyoxypropylene polymer (polymer A) having, in each molecule thereof, about one methyldimethoxysilyl group on average.

Synthesis Example 2

Propylene oxide was polymerized, using, as an initiator, a mixture in which a polyoxypropylene glycol having a number-average molecular weight of 14,600 (measured in the same manner as described above) and n-butanol were mixed with each other at a ratio by weight of 10/1 in the presence of a zinc hexacyanocobaltate glyme complex catalyst to yield a polypropylene oxide having a number-average molecular weight of about 8,000 (measured in the same manner as described above). Subsequently, to the polypropylene oxide having hydroxyl groups was added a solution of NaOMe in methanol, the quantity of NaOMe being an equivalent 1.2 times the quantity of the hydroxyl groups. Methanol was then distilled off, and further thereto was added 3-chloro-2-methyl-1-propene to convert the hydroxyl groups at the terminals to methallyl groups.

Into 100 parts by weight of the obtained crude polypropylene oxide having the methallyl groups were blended 300 parts by weight of n-hexane and 300 parts by weight of water, and then the blend was stirred. The water was then removed by centrifugation. Into the resultant hexane solution were further blended 300 parts by weight of water. The blend was stirred and then again subjected to centrifugation to remove the water. Thereafter, hexane was removed by devolatizing under reduced pressure. This process gave a polypropylene oxide having a number-average molecular weight of about 8,000 in terms of that of polystyrene according to GPC, and containing as a main component, a component having a methallyl group only at respective single terminal thereof introduced.

In the presence of 150 ppm of a solution of a platinum vinylsiloxane complex in isopropanol, as a catalyst, the content by percentage of platinum therein being 3% by weight, 2.3 parts by weight of methyldimethoxysilane were caused to react with 100 parts by weight of the resultant polypropylene oxide having the methallyl groups at 90° C. for 5 hours to yield a polyoxypropylene polymer (polymer B) having, in each molecule thereof, about one methyldimethoxysilyl group on average.

Synthesis Example 3

Propylene oxide was polymerized, using, as an initiator, a polyoxypropylene glycol monobutyl ether having a molecular weight of about 1,200 (trade name: NEW POLE LB-285, manufactured by Sanyo Chemical Industries, Ltd.) in the presence of a zinc hexacyanocobaltate glyme complex catalyst to yield a polypropylene oxide having a number-average molecular weight of about 7,500 (measured in the same manner as described above). Subsequently, to the polypropylene oxide having hydroxyl groups was added a solution of NaOMe in methanol, the quantity of NaOMe being an equivalent 1.2 times the quantity of the hydroxyl groups. Methanol was then distilled off, and further thereto was added allyl chloride to convert the hydroxyl groups at the respective terminals to allyl groups.

Into 100 parts by weight of the obtained crude polypropylene oxide having, only at the respective single terminals of the molecules thereof, the allyl groups were blended 300 parts by weight of n-hexane and 300 parts by weight of water, and then the blend was stirred. The water was then removed by centrifugation. Into the resultant hexane solution were further blended 300 parts by weight of water. The blend was stirred and then again subjected to centrifugation to remove the water. Thereafter, hexane was removed by devolatizing under reduced pressure. This process gave a polypropylene oxide having a number-average molecular weight of about 7,500 in terms of that of polystyrene according to GPC and having, at respective single terminals of molecules thereof, allyl groups.

In the presence of 150 ppm of a solution of a platinum vinylsiloxane complex in isopropanol, as a catalyst, the content by percentage of platinum therein being 3% by weight, 1.9 parts by weight of methyldimethoxysilane were caused to react with 100 parts by weight of the resultant polypropylene oxide having at the respective single terminals the allyl groups at 90° C. for 2 hours to yield a polyoxypropylene polymer (polymer C) having, in each molecule thereof, about 0.8 methyldimethoxysilyl group on average.

Synthesis Example 4

Propylene oxide was polymerized, using, as an initiator, polypropylene glycol in the presence of a zinc hexacyanocobaltate glyme complex catalyst to yield a polypropylene oxide having a number-average molecular weight of about 7,500 (measured in the same manner as described above). Subsequently, to the hydroxyl-group-terminated polypropylene oxide was added a solution of NaOMe in methanol, the quantity of NaOMe being an equivalent 1.2 times the quantity of the hydroxyl groups. Methanol was then distilled off, and further thereto was added ally chloride to convert the hydroxyl groups at the respective terminals to allyl groups.

Into 100 parts by weight of the resultant unpurified allyl-group-terminated polypropylene oxide were blended 300 parts by weight of n-hexane and 300 parts by weight of water, and then the blend was stirred. The water was then removed by centrifugation. Into the resultant hexane solution were further blended 300 parts by weight of water. The blend was stirred and then again subjected to centrifugation to remove the water. Thereafter, hexane was removed by devolatizing under reduced pressure. This process gave a polypropylene oxide having a number-average molecular weight of about 7,500 in terms of that of polystyrene according to GPC and having, at respective terminals, allyl groups.

In the presence of 150 ppm of a solution of a platinum vinylsiloxane complex in isopropanol, as a catalyst, the content by percentage of platinum therein being 3% by weight, 3.8 parts by weight of methyldimethoxysilane were caused to react with 100 parts by weight of the resultant allyl-group-terminated polypropylene oxide at 90° C. for 2 hours to yield a polyoxypropylene polymer (polymer D) having, in each molecule thereof, about 1.6 methyldimethoxysilyl groups on average.

Synthesis Example 5

Propylene oxide was polymerized, using, as an initiator, a mixture in which a polyoxypropylene glycol having a number-average molecular weight of 14,600 (measured in the same manner as described above) and n-butanol were mixed with each other at a ratio by weight of 10/1 in the presence of a zinc hexacyanocobaltate glyme complex catalyst to yield a polypropylene oxide having a number-average molecular weight of about 8,000 (measured in the same manner as described above). Subsequently, to the polypropylene oxide having hydroxyl groups was added a solution of NaOMe in methanol, the quantity of NaOMe being an equivalent 1.2 times the quantity of the hydroxyl groups. Methanol was then distilled off, and further thereto was added 3-chloro-2-methyl-1-propene to convert the terminated hydroxyl groups of the molecules to methallyl groups.

Into 100 parts by weight of the crude polypropylene oxide having the methallyl groups were blended 300 parts by weight of n-hexane and 300 parts by weight of water, and then the blend was stirred. The water was then removed by centrifugation. Into the resultant hexane solution were further blended 300 parts by weight of water. The blend was stirred and then again subjected to centrifugation to remove the water. Thereafter, hexane was removed by devolatizing under reduced pressure. This process gave a polypropylene oxide having a number-average molecular weight of about 8,000 in terms of that of polystyrene according to GPC and having, only at respective single terminals of molecules thereof, methallyl groups.

In the presence of 150 ppm of a solution of a platinum vinylsiloxane complex in isopropanol, as a catalyst, the content by percentage of platinum therein being 3% by weight, 1.9 parts by weight of methyldimethoxysilane were caused to react with 100 parts by weight of the resultant polypropylene oxide having the methallyl groups at 90° C. for 5 hours to yield a polyoxypropylene polymer (polymer E) having, in each molecule thereof, about 0.8 methyldimethoxysilyl group on average.

Synthesis Example 6

Propylene oxide was polymerized, using, as an initiator, polypropylene glycol in the presence of a zinc hexacyanocobaltate glyme complex catalyst to yield a polypropylene oxide having a number-average molecular weight of about 28,500 (measured in the same manner as described above). Subsequently, to the hydroxyl-group-terminated polypropylene oxide was added a solution of NaOMe in methanol, the quantity of NaOMe being an equivalent 1.2 times the quantity of the hydroxyl groups. Methanol was then distilled off, and further thereto was added ally chloride to convert the hydroxyl groups of the respective terminals of the molecules to allyl groups.

Into 100 parts by weight of the crude ally-group-terminated polypropylene oxide were blended 300 parts by weight of n-hexane and 300 parts by weight of water, and then the blend was stirred. The water was then removed by centrifugation. Into the resultant hexane solution were further blended 300 parts by weight of water. The blend was stirred and then again subjected to centrifugation to remove the water. Thereafter, hexane was removed by devolatizing under reduced pressure. This process gave a polypropylene oxide having a number-average molecular weight of about 28,500 in terms of that of polystyrene according to GPC and having, at respective terminals of molecules thereof, allyl groups.

In the presence of 150 ppm of a solution of a platinum vinylsiloxane complex in isopropanol, as a catalyst, the content by percentage of platinum therein being 3% by weight, 1.0 part by weight of methyldimethoxysilane were caused to react with 100 parts by weight of the resultant allyl-group-terminated polypropylene oxide at 90° C. for 2 hours to yield a polyoxypropylene polymer (polymer P-1) having, in each molecule thereof, about 1.6 methyldimethoxysilyl groups on average.

Synthesis Example 7

Propylene oxide was polymerized, using, as an initiator, polypropylene glycol in the presence of a zinc hexacyanocobaltate glyme complex catalyst to yield a polypropylene oxide having a number-average molecular weight of about 28,500 (measured in the same manner as described above). Subsequently, to the hydroxyl-group-terminated polypropylene oxide was added a solution of NaOMe in methanol, the quantity of NaOMe being an equivalent 1.2 times the quantity of the hydroxyl groups. Methanol was then distilled off, and further thereto was added 3-chloro-2-methyl-1-propene to convert the terminated hydroxyl groups to methallyl groups.

Into 100 parts by weight of the resultant unpurified methallyl-group-terminated polypropylene oxide were blended 300 parts by weight of n-hexane and 300 parts by weight of water, and then the blend was stirred. The water was then removed by centrifugation. Into the resultant hexane solution were further blended 300 parts by weight of water. The blend was stirred and then again subjected to centrifugation to remove the water. Thereafter, hexane was removed by devolatizing under reduced pressure. This process gave a polypropylene oxide having a number-average molecular weight of about 28,500 in terms of that of polystyrene according to GPC and having, at respective terminals, methallyl groups.

In the presence of 150 ppm of a solution of a platinum vinylsiloxane complex in isopropanol, as a catalyst, the content by percentage of platinum therein being 3% by weight, 2.3 parts by weight of methyldimethoxysilane were caused to react with 100 parts by weight of the resultant methallyl-group-terminated polypropylene oxide at 90° C. for 5 hours to yield a polyoxypropylene polymer (polymer P-2) having, in terminals of each molecule thereof, about two methyldimethoxysilyl groups on average.

Example 1

The following were mixed with each other: 100 parts by weight of the polymer P-1 yielded in Synthesis Example 6; 55 parts by weight of the polymer A yielded in Synthesis Example 1; 120 parts by weight of surface-treated colloidal calcium carbonate (trade name: HAKUENKA CCR, manufactured by Shiraishi Kogyo Kaisha, Ltd.); 20 parts by weight of titanium oxide (trade name: TIPAQUE R-820, manufactured by Ishihara Sangyo Kaisha, Ltd.); 2 parts by weight of a dripping preventive (trade name: DISPARLON 6500, manufactured by Kusumoto Chemicals, Ltd.); 1 part by weight of a benzotriazole type ultraviolet absorbent (trade name: TINUVIN 326, manufactured by BASF Japan Ltd.); and 1 part by weight of a hindered amine type light stabilizer (trade name: SANOL LS770, manufactured by Sankyo Lifetech Co., Ltd.). The mixture was sufficiently kneaded, and then passed through a painting triple roll three times to disperse the dispersible components. The resultant was allowed to stand still at 23° C. and 50% RH throughout the night. The resultant was used as a main blend agent. The viscosity of this main blend agent was measured, and then thereto were added 2 parts by weight of vinyltrimethoxysilane (trade name: Silquest A-171, manufactured by Momentive Performance Materials Inc.) as a dehydrating agent, 3 parts by weight of γ-(2-aminoethyl)aminopropyltrimethoxysilane (trade name: Silquest A-1120, manufactured by Momentive Performance Materials Inc.) as a tackifier, and 2 parts by weight of dibutyltin bisacetylacetonate (trade name: NEOSTAN U-220H, manufactured by Nitto Kasei Co., Ltd.) as a curing catalyst. The mixture was then kneaded to yield a curable composition. This curable composition was measured about the skinning period, the respective remaining tackinesses (the tackinesses of the surface) after one day, three days and seven days, the dumbbell tensile property, and the paint anti-staining property in accordance with methods described below.

Example 2, and Comparative Example 1 to Comparative Example 4

Each curable composition was yielded in the same way as in Example 1 except that instead of the polymer A in Example 1, a polymer or plasticizer shown in Table 1 was used. The composition was evaluated in the same way.

Example 3

The following were mixed with each other: 70 parts by weight of the polymer P-1 yielded in Synthesis Example 6; 30 parts by weight of the polymer B yielded in Synthesis Example 2; 120 parts by weight of surface-treated colloidal calcium carbonate (trade name: HAKUENKA CCR, manufactured by Shiraishi Kogyo Kaisha, Ltd.); 20 parts by weight of titanium oxide (trade name: TIPAQUE R-820, manufactured by Ishihara Sangyo Kaisha, Ltd.); 55 parts by weight of a phthalic acid ester type plasticizer (trade name: DIDP, manufactured by J-Plus Co., Ltd.); 2 parts by weight of a dripping preventive (trade name: DISPARLON 6500, manufactured by Kusumoto Chemicals, Ltd.); 1 part by weight of a benzotriazole type ultraviolet absorbent (trade name: TINUVIN 326, manufactured by BASF Japan Ltd.); and 1 part by weight of a hindered amine type light stabilizer (trade name: SANOL LS770, manufactured by Sankyo Lifetech Co., Ltd.). The mixture was sufficiently kneaded, and then passed through a painting triple roll three times to disperse the dispersible components. The resultant was allowed to stand still at 23° C. and 50% RH throughout the night. The resultant was used as a main blend agent. The viscosity of this main blend agent was measured, and then thereto were added 2 parts by weight of vinyltrimethoxysilane (trade name: Silquest A-171, manufactured by Momentive Performance Materials Inc.) as a dehydrating agent, 3 parts by weight of γ-(2-aminoethyl) aminopropyltrimethoxysilane (trade name: Silquest A-1120, manufactured by Momentive Performance Materials Inc.) as a tackifier, and 1 part by weight of dibutyltin dilaurate (trade name: NEOSTAN U-100, manufactured by Nitto Kasei Co., Ltd.) as a curing catalyst. The mixture was then kneaded to yield a curable composition. This curable composition was measured about the respective remaining tackinesses (the tackinesses of the surface) after one day, three days and seven days, the dumbbell tensile property, and the elastic restorability in accordance with methods described below.

Example 4 to Example 5, and Comparative Example 5 to Comparative Example 8

Each curable composition was yielded in the same way as in Example 3 except that instead of the polymer P-1 and the polymer B in Example 3, one or more polymers shown in Table 2 were used. The composition was evaluated in the same way.

Example 6, Example 7 and Comparative Example 9

Each curable composition was yielded in the same way as in Example 3 except that 100 parts by weight of the polymer P-1 in Example 3 were used, the species or the amount of the polymer B was changed as shown in Table 2, and no phthalic acid ester type plasticizer was used. The composition was evaluated in the same way.

Hereinafter, each method for the evaluation will be described.
(Main Blend Agent Viscosity)
Each of the main blend agents was filled into a cup of 100 mL volume with no foam therein. A BS type viscometer (manufactured by Tokimec Inc.) and a rotor No. 7 were used to make measurements at 23° C. and 50% RH about the respective viscosities of the composition at 1 rpm, 2 rpm, and 10 rpm.

(Skinning Period)
A spatula was used to spread each of the curable compositions so as to have a thickness of about 3 mm at 23° C. and 50% RH. A microspatula was used to touch the surface of the curable composition lightly and intermittently. In this way, the period until the composition came not to stick to the microspatula was measured.
(Remaining Tackiness)
Each of the curable composition obtained as described was spread so as to have a thickness of about 3 mm, and allowed to stand still at 23° C. and 50% RH. After 1 day, 3 days and 7 days, one lightly touched the surface thereof with the forefinger to evaluate the respective tackiness feeling degrees. The tackiness feeling was represented by 8-grade numbers. The grade 8 represents no tackiness feeling; 5, a slight tackiness feeling; 3, a strong tackiness feeling; and 1, an uncured state. On the basis of this criterion, the remaining tackiness of the composition was determined.
(Tensile Properties)
Each of the curable compositions was made into a sheet-shaped test piece of 3 mm thickness. The test piece was kept at 23° C. and 50% RH for 3 days, and further put in a drying machine at 50° C. for 4 days to be completely cured. The test piece was punched out into a #3 dumbbell-form. An autograph manufactured by Shimadzu Corp. was then used to subject the dumbbell-form sample to a tensile test at a tension speed of 200 mm/minute. Thus, the sample was measured about the 50% modulus, the 100% modulus, the breaking strength, and the elongation at break, which are represented by M50, M100, TB, EB, respectively.
(Paint Anti-Staining Property)
Each of the curable compositions was used and formed into a sheet-shaped test piece of 3 mm thickness. The test piece was allowed to stand still at 23° C. and 50% RH for 3 days, and then cured at 50° C. over 4 days. An aqueous acrylic emulsion paint (trade name: "PLEASE COAT", manufactured by SK Kaken Co., Ltd.) was applied onto a surface of this sheet, and further allowed to stand still at 23° C. and 50% RH for 7 days. Thereafter, a silica sand, 67 BLACK, manufactured by Shintoh Tohryou Co., Ltd. was used and applied evenly onto the sample surface. After three hours elapsed, the silica sand was lightly brushed away. The state of the sample at this time was observed. The paint anti-staining property was represented by 5-grade numbers. The grade 5 represents no adhesion of the silica sand (less than 2 mg/cm$^2$); 3, the adhesion of a slight amount of the silica sand (10 mg/cm$^2$ or more and less than 20 mg/cm$^2$); and 1, the adhesion of many grains of the silica sand onto the entire surface (30 mg/cm$^2$ or more). On the basis of this criterion, the paint anti-staining property of the composition was determined.
(Elastic restorability)
A #3 dumbbell-form test piece produced in the same process as in the above-mentioned tensile properties was stretched by 60%, and then kept at 23° C. and 50% RH for 24 hours. Thereafter, the force for the stretching was released, and then the test piece was allowed to stand still under the same conditions. After one hour and 24 hours, the respective degrees that the test piece was restored were measured. When the sample is completely restored into the original state, the sample is judged to have an elastic restorability of 100%. When the sample is not restored at all, the sample is judged to have an elastic restorability of 0%.

Tables 1 and 2 show the composition and the physical properties of each of the working examples and the comparative examples.

TABLE 1

|  | Example 1 | Example 2 | Comparative Example 1 | Comparative Example 2 | Comparative Example 3 | Comparative Example 4 |
|---|---|---|---|---|---|---|
| Polymer P-1 | 100 | 100 | 100 | 100 | 100 | 100 |
| Polymer A | 55 | | | | | |
| Polymer B | | 55 | | | | |
| DIDP | | | 55 | | | |
| PPG3000 | | | | 55 | | |
| Polymer C | | | | | 55 | |
| Polymer D | | | | | | 55 |
| HAKUENKA CCR | 120 | 120 | 120 | 120 | 120 | 120 |
| TIPAQUE R-820 | 20 | 20 | 20 | 20 | 20 | 20 |
| DISPARLON 6500 | 2 | 2 | 2 | 2 | 2 | 2 |
| T-326 | 1 | 1 | 1 | 1 | 1 | 1 |
| LS-770 | 1 | 1 | 1 | 1 | 1 | 1 |
| A-171 | 2 | 2 | 2 | 2 | 2 | 2 |
| A-1120 | 3 | 3 | 3 | 3 | 3 | 3 |
| NEOSTAN U-220H | 2 | 2 | 2 | 2 | 2 | 2 |
| Skinning period (minutes) | 60 | 55 | 30 | 40 | 45 | 45 |
| Viscosity (Pa·s) | | | | | | |
| 1 rpm | 2050 | 2100 | 1800 | 2030 | 2220 | 2040 |
| 2 rpm | 1215 | 1230 | 1040 | 1200 | 1270 | 1180 |
| 10 rpm | 400 | 410 | 340 | 415 | 430 | 390 |
| Viscosity ratio (2 rpm/10 rpm) | 3.04 | 3.00 | 3.06 | 2.89 | 2.95 | 3.03 |
| Respective remaining tackinesses after 1 day/3 days/7 days | 5/5/5 | 5/5/5 | 5/5/5 | 5/5/5 | 5/5/5 | 5/6/6 |
| Tensile properties | | | | | | |
| M50 (MPa) | 0.22 | 0.23 | 0.25 | 0.25 | 0.21 | 0.45 |
| M100 (MPa) | 0.35 | 0.37 | 0.42 | 0.41 | 0.35 | 0.73 |
| TB (MPa) | 2.13 | 2.02 | 2.25 | 2.15 | 1.92 | 2.83 |
| EB (%) | 1000 | 1100 | 950 | 930 | 990 | 780 |
| Paint anti-staining property | 5 | 5 | 1 | 2 | 3 | 3 |

TABLE 2

|  | Example 3 | Example 4 | Comparative Example 5 | Comparative Example 6 | Example 5 | Comparative Example 7 | Comparative Example 8 | Example 6 | Example 7 | Comparative Example 9 |
|---|---|---|---|---|---|---|---|---|---|---|
| Polymer P-1 | 70 | 70 | 70 | 100 | | | | 100 | 100 | 100 |
| Polymer P-2 | | | | | 70 | 70 | 100 | | | |
| Polymer B | 30 | | | | 30 | | | 55 | | |
| Polymer E | | 30 | | | | | | | 55 | |
| Polymer C | | | 30 | | | 30 | | | | 55 |
| HAKUENKA CCR | 120 | 120 | 120 | 120 | 120 | 120 | 120 | 120 | 120 | 120 |
| TIPAQUE R-820 | 20 | 20 | 20 | 20 | 20 | 20 | 20 | 20 | 20 | 20 |
| DIDP | 55 | 55 | 55 | 55 | 55 | 55 | 55 | | | |
| DISPARLON 6500 | 2 | 2 | 2 | 2 | 2 | 2 | 2 | 2 | 2 | 2 |
| T-326 | 1 | 1 | 1 | 1 | 1 | 1 | 1 | 1 | 1 | 1 |
| LS-770 | 1 | 1 | 1 | 1 | 1 | 1 | 1 | 1 | 1 | 1 |
| A-171 | 2 | 2 | 2 | 2 | 2 | 2 | 2 | 2 | 2 | 2 |
| A-1120 | 3 | 3 | 3 | 3 | 3 | 3 | 3 | 3 | 3 | 3 |
| U-100 | 1 | 1 | 1 | 1 | 1 | 1 | 1 | 1 | 1 | 1 |
| Viscosity (Pa·s) | | | | | | | | | | |
| 1 rpm | 2750 | 2720 | 2640 | 3130 | 3000 | 2615 | 3205 | 3385 | 3170 | 3300 |
| 2 rpm | 1480 | 1490 | 1495 | 1710 | 1650 | 1535 | 1760 | 1910 | 1850 | 1880 |
| 10 rpm | 420 | 420 | 410 | 495 | 465 | 420 | 520 | 560 | 545 | 555 |
| Viscosity ratio (2 rpm/10 rpm) | 3.52 | 3.55 | 3.65 | 3.45 | 3.55 | 3.65 | 3.38 | 3.41 | 3.39 | 3.39 |

TABLE 2-continued

|  | Example 3 | Example 4 | Comparative Example 5 | Comparative Example 6 | Example 5 | Comparative Example 7 | Comparative Example 8 | Example 6 | Example 7 | Comparative Example 9 |
|---|---|---|---|---|---|---|---|---|---|---|
| Respective remaining tackinesses after 1 day/ 3 days/7 days | 3/5/5 | 3/5/5 | 3/5/5 | 4/6/6 | 3/5/6 | 3/5/6 | 3/5/6 | 4/5/6 | 4/5/6 | 4/5/6 |
| Tensile properties |  |  |  |  |  |  |  |  |  |  |
| M50 (MPa) | 0.11 | 0.11 | 0.10 | 0.26 | 0.27 | 0.26 | 0.56 | 0.23 | 0.23 | 0.22 |
| M100 (MPa) | 0.19 | 0.20 | 0.18 | 0.44 | 0.45 | 0.43 | 0.87 | 0.38 | 0.37 | 0.35 |
| TB (MPa) | 1.29 | 1.35 | 1.21 | 2.42 | 2.53 | 2.46 | 2.51 | 2.85 | 2.85 | 2.54 |
| EB (%) | 940 | 940 | 925 | 865 | 930 | 940 | 490 | 1015 | 1020 | 1000 |
| Elastic restorabilities (%) |  |  |  |  |  |  |  |  |  |  |
| After 1 hour | 46 | 47 | 30 | 62 | 68 | 60 | 78 | 51 | 52 | 40 |
| After 24 hours | 61 | 62 | 48 | 77 | 84 | 75 | 88 | 68 | 68 | 59 |

Table 1 shows the composition of the curable compositions in which 55 parts by weight of each of the various plasticizers were used for 100 parts by weight of the organic polymer having at both terminals thereof reactive silicon groups; and the physical properties thereof. As asserted about the present invention, the polymer A, which was an organic polymer having at one-side out of terminals thereof a silicon group and further the proportion of the silicon-group-introduced molecules was made high, exhibited physical properties of a low modulus and a high elongation, and favorably the paint coat applied after the composition was cured was not stained. It is understood that the polymer B, in which components each having silicon-group-introduced both terminals were contained in a small proportion but almost all components each had only at one-side out of terminals thereof a reactive silicon group, exhibited substantially the same physical properties as the polymer A.

In Comparative Example 1, wherein the conventionally-used phthalic acid ester type plasticizer DIDP was used, the paint anti-staining property was bad. Also in Comparative Example 2, wherein the PPG plasticizer having a molecular weight of 3,000 was used, the paint anti-staining property was made better than that using the DIDP, but was insufficient.

The polymer C was a polymer having a reactive silicon group introduced only into one-side out of terminals thereof. However, the paint anti-staining property of Comparative Example 3, wherein this polymer was used, was not complete. The paint anti-staining property of Comparative Example 4, wherein the polymer D was used, was not complete, either. About the cured-product physical-properties thereof, the modulus and the elongation were high. Thus, the case of Comparative Example 4 was unsuitable for a sealing material for architecture. It is presumed that this result was based on a matter that the polymer D contained not only molecules each having both terminals into which the silicon groups were introduced, but also free molecules, into which no silicon groups were introduced.

In Table 2, Examples 3 and 4, and Comparative Example 5 each show physical properties of an example wherein 30 parts by weight out of 100 parts by weight of the reactive-silicon-group-containing polymer were replaced by the same amount of a reactive plasticizer. Example 3 can be regarded as an example wherein 30 parts by weight out of 100 parts by weight of the polymer P-1 in Comparative Example 6 were replaced by the same amount of the polymer B. Example 3 was low in viscosity to be good in workability, and the cured product thereof was low in modulus and high in elongation.

Comparative Example 5, wherein the polymer C was used, also produced the similar advantageous effects but exhibited a low value in elastic restorability. Like the polymer B, the polymer E was a polymer into which a reactive silyl (group) was introduced via a methallyl group. The content of the silyl group was equal to that in the polymer C. The elastic restorability of Example 4, wherein this polymer E was used, was largely higher than that of the comparative example, wherein the polymer C with the same content of the silyl group (as polymer E) was used. In conclusion, these examples demonstrate that not the content of the introduced silyl groups but a specific structure near the silyl group(s) contributes to the elastic restorability.

Example 5 and Comparative Examples 7 and 8 show results obtained by making the same evaluations in the state that the polymer P-1 was replaced by the polymer P-2. It is understood that these cases also gave the same results about physical property differences from between the polymers B and C, and the use of the component (A), which had the specific reactive silicon group, resulted in a characteristic that a higher elastic restorability was exhibited.

Examples 6 and 7, and Comparative Example 9 were each a system in which 100 parts by weight of the polymer P-1 were used, 55 parts by weight of the component having only at one molecular terminal thereof a reactive silyl group were used and further a phthalic acid ester type plasticizer, which is an ordinary plasticizer, was not used. These cases also demonstrate that the use of the component (A), which has a specific reactive silicon group, provides a curable composition exhibiting a high elastic restorability.

INDUSTRIAL APPLICABILITY

The curable composition of the present invention is usable as a pressure-sensitive adhesive, a sealing material for a structure, a ship, an automobile, a road and others, an adhesive, a mold-forming material, a vibration proof material, a vibration deadening material, a soundproof material, a foaming material, a paint, a spraying material, and others. Since a cured product obtained by curing the curable composition of the present invention is excellent in flexibility and adhesive property, the curable composition is preferably used as a sealing material or an adhesive among these articles.

The curable composition is also usable as various articles, for example, an electrical or electronic member material such as a solar battery rear-surface sealing material, an electrical insulating material such as an insulating coating material for an electrical wire or cable, an elastic adhesive, a contact-type adhesive, a spraying type sealing material, a crack repairing material, an adhesive for tiling, a powder coating, a casting material, a rubbery material for medicine, a pressure-sensitive adhesive for medicine, a sealing material for medical machinery, a food packaging material, a sealing material for joining exterior members such as siding boards with each other, a coating material, a primer, an electroconductive material for shielding electromagnetic waves, a thermoconductive material, a hot melt material, a potting agent for an electrical or electronic member, a film, a gasket, various shaping-materials, a rust inhibitive or waterproof material for an end face (cut face) of a piece of wire glass or laminated glass, and a liquid sealing agent used in automobile parts, electrical members, and various mechanical members. Since the curable composition can adhere, alone or by aid of a primer, closely to various base materials or members such as glass, porcelain, wood, metal, or a resin-shaped product, the composition is further usable as a sealing composition or an adhesive composition that may be of various types. Moreover, the curable composition of the present invention is also usable as an adhesive for interior panels, an adhesive for exterior panels, an adhesive for tiling, an adhesive for laying a stone material, an adhesive for ceiling-finish, an adhesive for floor-finish, an adhesive for wall-finish, an adhesive for vehicle panels, an adhesive for fabricating an electrical, electronic or precision instrument, a sealing material for direct glazing, a sealing material for laminated glass, a sealing material for an SSG construction method, or a sealing for a working joint of a building.

The invention claimed is:

1. A curable composition, comprising:
an organic polymer (A), having a number-average molecular weight of 800 to 15,000, and comprising 0.5 or more but less than 1.2 reactive silicon groups in each molecule of the polymer on average, the silicon group being represented by the following general formula (1):

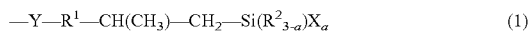

$$—Y—R^1—CH(CH_3)—CH_2—Si(R^2_{3-a})X_a \qquad (1)$$

wherein $R^1$ represents a bivalent organic group having 1 to 20 carbon atoms and containing, as one or more constituent atoms, one or more selected from the group consisting of hydrogen, carbon and nitrogen atoms; $R^2$ represents an alkyl group having 1 to 20 carbon atoms, an aryl group having 6 to 20 carbon atoms, an aralkyl group having 7 to 20 carbon atoms, or a triorganosiloxy group represented by $—OSi(R')_3$ wherein the three R's, which may be the same or different, are each a monovalent hydrocarbon group having 1 to 20 carbon atoms; X represents a hydroxyl group or a hydrolysable group provided that when Xs, the number of which is two or more, are present, Xs may be the same or different; Y is a heteroatom, and is selected from an oxygen atom or a nitrogen atom; and a is an integer of 1 to 3;

and an organic polymer (B) having a number-average molecular weight of 5,000 to 50,000 and having 1.2 to 5 reactive silicon groups in each molecule of the organic polymer (B) on average.

2. The curable composition according to claim 1, wherein the organic polymer (B) has a main chain that is one or more selected from polyoxyalkylene polymers, polyacrylic polymers, and hydrocarbon polymers.

3. The curable composition according to claim 1, wherein the reactive silicon group of the organic polymer (B) is a methyldimethoxysilyl group.

4. The curable composition according to claim 1, wherein the organic polymer (B) is used in an amount of 20 to 2000 parts by weight for 100 parts by weight of the organic polymer (A).

5. The curable composition according to claim 1, wherein a phthalic acid ester type plasticizer is used in an amount of 1 to 20 parts by weight for 100 parts by weight of the organic polymer (A).

6. The curable composition according to claim 1, wherein the organic polymer (A) contains 0.5 to 1.05 reactive silicon groups in each molecule of the polymer on average, the silicon group(s) being (each) represented by the general formula (1).

7. The curable composition according to claim 1, wherein the organic polymer (A) has a number-average molecular weight of 2,000 to 11,000.

8. The curable composition according to claim 1, wherein the organic polymer (B) is used in an amount of 120 to 700 parts by weight for 100 parts by weight of the organic polymer (A).

* * * * *